United States Patent [19]
Meek et al.

[11] Patent Number: 6,125,171
[45] Date of Patent: *Sep. 26, 2000

[54] METHOD AND TELECOMMUNICATION SYSTEM FOR TRANSMITTING A FACSIMILE MESSAGE

[75] Inventors: Jeffrey James Meek, Lake in the Hills; William Harvey Meek, Chicago; Gordon Lynn Blumenschein, Woodridge, all of Ill.

[73] Assignee: Ameritech Corporation, Hoffman Estates, Ill.

[ * ] Notice: This patent is subject to a terminal disclaimer.

[21] Appl. No.: 09/086,758

[22] Filed: May 28, 1998

Related U.S. Application Data

[63] Continuation-in-part of application No. 08/787,347, Jan. 27, 1997.

[51] Int. Cl.[7] .......................... H04M 11/00; H04M 3/42; H04N 1/00
[52] U.S. Cl. .................... 379/100.09; 379/211; 358/407; 358/440
[58] Field of Search .............................. 379/88.22, 88.25, 379/93.14, 93.24, 100.01, 100.05–100.09, 100.12, 100.14–100.15, 201, 210, 211–213, 220, 230; 358/400, 434, 440, 442, 407

[56] References Cited

U.S. PATENT DOCUMENTS

| | | | |
|---|---|---|---|
| 4,922,348 | 5/1990 | Gillon et al. | 357/407 |
| 4,935,955 | 6/1990 | Neudorfer | 379/100.09 |
| 4,994,926 | 2/1991 | Gordon et al. | 358/402 |
| 5,014,300 | 5/1991 | Harvath et al. | 379/100.09 |
| 5,018,191 | 5/1991 | Catron et al. | 379/100.09 |
| 5,146,348 | 9/1992 | Kaneyama | 358/407 |
| 5,170,428 | 12/1992 | Watanabe et al. | 379/100.09 |
| 5,291,302 | 3/1994 | Gordon et al. | 358/402 |
| 5,291,546 | 3/1994 | Giler et al. | 379/93.11 |
| 5,299,255 | 3/1994 | Iwaki et al. | 358/402 |
| 5,321,741 | 6/1994 | Kaneko et al. | 379/100.06 |
| 5,339,174 | 8/1994 | Harris | 358/442 |
| 5,392,336 | 2/1995 | Chang et al. | 358/402 |
| 5,444,774 | 8/1995 | Friedes | 379/210 |
| 5,459,584 | 10/1995 | Gordon et al. | 358/402 |
| 5,467,390 | 11/1995 | Brankley et al. | 379/93.14 |
| 5,475,737 | 12/1995 | Garner et al. | 379/211 |
| 5,566,235 | 10/1996 | Hetz | 379/201 |
| 5,583,926 | 12/1996 | Venier et al. | 379/207 |
| 5,592,541 | 1/1997 | Fleischer, III et al. | 379/220 |
| 5,600,710 | 2/1997 | Weisser et al. | 379/210 |
| 5,729,595 | 3/1998 | Kugell et al. | 379/100.09 |
| 5,740,237 | 4/1998 | Malik et al. | 379/211 |
| 5,754,640 | 5/1998 | Sosnowski | 379/207 |

FOREIGN PATENT DOCUMENTS

| | | |
|---|---|---|
| 0 360 732 A2 | 3/1990 | European Pat. Off. . |
| WO 92/14334 | 8/1992 | WIPO . |

*Primary Examiner*—Paul Loomis
*Assistant Examiner*—George Eng
*Attorney, Agent, or Firm*—Brinks Hofer Gilson & Lione

[57] ABSTRACT

A method and system for transmitting a facsimile message uses a public-switched telecommunications network, the public-switched telecommunication network having a messaging platform capable of storing a plurality of facsimile messages. The initiation of a telephone call to a destination is detected, the content of the call including the facsimile message. If the destination is available at a first time to receive a telephone call, the facsimile message is transmitted. The facsimile message may be stored on the messaging platform only if the destination is unavailable at the first time, or every time a telephone call is initiated by the originating party. The method also provides for situations where a telephone call is redirected, where an inter-NPA seven digit dialing case has occurred, and where "busy" or "no_answer" triggers are implemented. If the facsimile message was stored, the facsimile message is transmitted at a second time if the destination is available.

47 Claims, 27 Drawing Sheets

METHOD AND TELECOMMUNICATION SYSTEM FOR TRANSMITTING A FACSIMILE MESSAGE

This application is a continuation-in-part of U.S. application Ser. No. 08/787,347, filed Jan. 27, 1997, which is hereby incorporated by reference herein.

TECHNICAL FIELD

The present invention relates to telecommunication systems, and in particular to systems and methods for storing and transmitting facsimile messages.

BACKGROUND ART

Facsimile machines or more commonly "fax" machines are used for sending documents and other images from place to place over the telephone network. The originating fax machine places a telephone call to a destination fax machine. The content of the telephone call is a modulated waveform that represents the image to be transmitted. In some cases the destination line is busy or there is no answer, perhaps because the destination fax is either sending or receiving another fax or the destination fax is broken or out of paper. If a call can not be competed, most fax machines will attempt to redial the destination fax machine periodically in an attempt to complete the fax transmission. When the originating fax is attempting to complete the fax transmission, this can monopolize all or partial use of the fax machine for a period of time.

U.S. Pat. No. 4,922,348 issued to Gillon et al. solves some of the related problems by recognizing a fax message and directing fax messages to a storage unit where they later can be forwarded to a destination fax machine or high-speed printer. By always storing fax messages in a fax storage unit, the system of Gillon et al. requires a great deal of storage and throughput capabilities to handle large volumes of fax traffic.

BRIEF DESCRIPTION OF THE DRAWINGS

The invention is pointed out with particularity in the appended claims. However, other features of the invention will become apparent and the invention will be best understood by referring to the following detailed description in conjunction with the accompanying drawings in which:

DETAILED DESCRIPTION OF THE PREFERRED EMBODIMENTS

The various embodiments of the present invention yield several advantages over the prior art. In one embodiment, the telecommunication system and method of the present invention transmit a fax message directly to the destination and store a fax message at a messaging platform only if the destination for the fax is busy or does not answer. This provides advantages from the prior art by decreasing the use of the messaging platform—from all facsimile transmissions—to only those transmissions where the destination either is busy or does not answer.

In one embodiment of the present invention, the methods described herein are implemented in an Advanced Intelligent Network (AIN) used by many local exchange carriers and interexchange carriers. This provides an efficient and uniform method of implementation for both local and long-distance telecommunication service.

In one embodiment of the present invention, the methods described herein allow the present invention to be implemented in conjunction with the call forwarding service. This insures that any party in the chain of forwarded (redirected) telephone calls may receive the benefits of the present invention.

In one embodiment of the present invention, the methods described herein allow the present invention to be implemented where the originating party initiates a telephone call using a seven digit direct dialed telephone number. This allows parties in different NPAs yet who are close enough to contact one another by dialing seven rather than ten digits to benefit from the present invention.

In one embodiment of the present invention, the methods described herein allow the present invention to be implemented using busy or no_answer triggers. This allows more efficient operation of the telecommunications system as the service control point is not contacted until a busy or no_answer querry is received by the service switching point. The service switching point attempts to connect the telephone call without contacting the service control point. If the service switching point is unable to complete the telephone call, a busy querry or a no_answer querry is launched from the service switching point. The service switching point then contacts the service control point, which returns a routing message to route the telephone call to the messaging platform.

Figure 1:
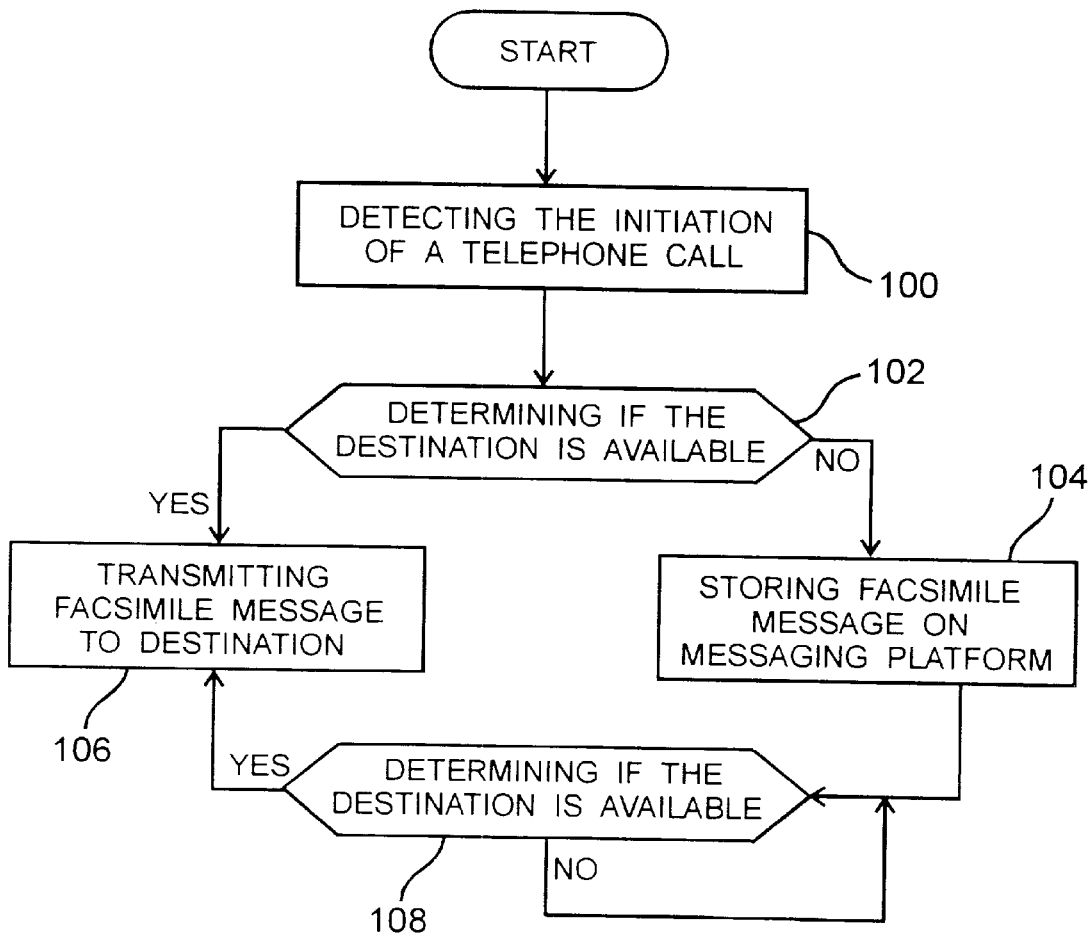
FIG. 1 presents a flowchart representation of a method in accordance with the present invention.

FIG. 1 presents a flowchart representation of a method in accordance with the present invention. This flowchart illustrates a method of transmitting a facsimile message using a public-switched telecommunications network, the public-switched telecommunication network having a messaging platform capable of storing a plurality of facsimile messages. The method begins in step 100 by detecting the initiation of a telephone call to a destination on the telecommunications network, the content of the call including the facsimile message (the content of the telephone call may include voice and data information as mentioned Infra in the description of FIGS. 10 and 19–20) Step 102 continues by determining if the destination is available to receive a telephone call—the time of this determination being designated as the "first time".

If the destination is available at the first time, then the method proceeds to step 106 by transmitting the facsimile message to the destination. If, however, the destination is unavailable at the first time the method proceeds as shown in step 104 by storing the facsimile message on the messaging platform. If the facsimile message was stored the method proceeds by determining, as shown in step 108, if the destination is available at some later time—to be designated the "second time". If the destination is available at the second time, the method proceeds to step 106 and transmits the facsimile message. If, however, the destination is unavailable at the second time, the method proceeds back to step 108 and continues to try again to find the destination available.

It is worthwhile to note that, in the method described above, the facsimile message is stored on the messaging platform only if the destination is unavailable at the first time. This means that other facsimile messages can be routed to the destination without storage and without using the messaging platform. This allows the messaging platform to have either lower memory requirements to handle normal call volume or, alternatively, allows greater call capacity for a fixed memory size.

In one embodiment of the present invention, the number of times that the step 108 is repeated is limited to some finite number n. After trying n times to reach the destination, an error message, indicating that the facsimile message could not be sent to the destination is, instead, routed back to the originating fax. This avoids a potential problem where the destination, due to some fault or error, would not become available within a reasonable period of time. This also allows the user at the originating fax to know that the facsimile message did not go through and gives the user the opportunity to check the number for the destination and possibly to check into the operation status of the fax machine at the destination.

In an alternative embodiment of the present invention, if the number or delivery attempts to the destination have been exhausted, rather than sending a facsimile message to the originating fax machine, an administrative facility, such as a service bureau, can be notified of the failure along with the content of the facsimile message. In this fashion, administrative personnel can try to manually send the facsimile message or can take other steps such as contacting the originator of the facsimile message.

In an additional embodiment of the present invention, the way that the failure to deliver a facsimile message is handled is dependent upon a failure condition. The messaging platform will continue to attempt to deliver a facsimile message to the destination if the destination is repeatedly busy or there is no answer. If, however, the platform recognizes that a fax tone is not returned upon answer (implying a voice answer) then delivery attempts may be canceled after a fewer number of retries so as not to annoy the receiver. The number of retries allowed in either failure condition may be a system administration parameter that is constant for all users. Alternatively, the number of retries allowed for each failure condition could be customized at subscriber request for each subscriber if desired.

The methods described above, if the facsimile message were stored, would generally require initiating a new telephone call to the destination. In a further embodiment of the present invention, if the destination was unavailable at the first time, the method proceeds to "camp-on" the destination to wait for the destination to become available. In this fashion, once an indication is received that the destination is available the transmission of the facsimile message to the destination can be initiated. In this embodiment, a timer could be set to time the period that the system has camped-on a particular destination. After a predetermined time period has been exceeded, this method would resort to routing an error message back to the originating fax machine to indicate the message could not be sent.

In the various embodiments described above, a stored facsimile message could also be erased from the messaging platform after the message is properly sent or after the messaging platform determines that the message cannot be sent. This allows the particular portions of memory on the messaging platform used to store the facsimile message to be reused to store additional messages.

It should also be noted that the various methods described above and the other embodiments of the present invention described herein—like a normal facsimile transmission—operate by having the user initiate a facsimile transmission to the telephone number corresponding to the destination. They enter the telephone number of destination on their fax machine. The fax machine operates as normal and the message is transmitted—either to the messaging platform or to the destination. In either case the fax machine itself is free for sending and receiving additional faxes. The user does not direct the facsimile message to the messaging platform. The facsimile message is routed to the messaging platform only if the destination is unavailable.

Figure 2:
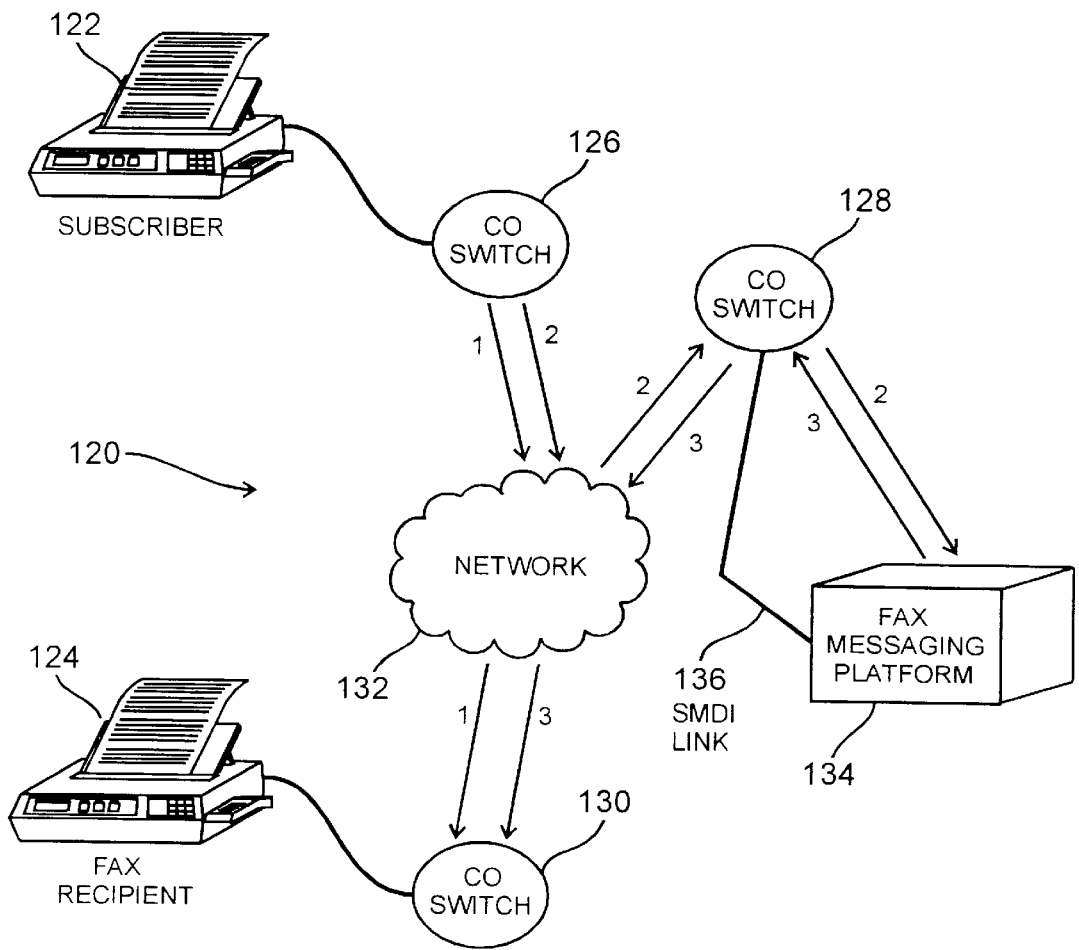
FIG. 2 presents a block diagram representation of a telecommunication system in accordance with the present invention.

FIG. 2 presents a block diagram representation of a telecommunication system in accordance with the present invention. Telecommunication system 120 is provided to route a facsimile message from subscriber fax unit 122 to fax recipient 124. Telecommunication system 120 includes central office switches 126, 128 and 130 that are interconnected via network 132. In addition, messaging platform 134 is provided and is connected to central office switch 128 by means of a simplified message desk interface (SMDI) link 136.

In operation, the subscriber attempts to send a facsimile message to fax recipient 124. If fax recipient 124 answers then the facsimile message is routed as shown in path 1 through central office switches 126 and 130.

If the fax recipient 124 is busy or does not answer, the facsimile message is routed as shown in path 2 through central office switches 126 and 128 to messaging platform 134 for storage and redelivery. In a preferred embodiment, direct inward dialing (DID) is used to transmit the facsimile message from the central office switch 128 to messaging platform 134. The messaging platform 134 then attempts to call the fax recipient's line to deliver the stored fax as shown by path 3. In a preferred embodiment, a feature group D (FGD) protocol is used to communicate between the messaging platform 134 and the central office switch 128. If the facsimile message cannot be delivered on the first attempt, the platform will continue trying, based on a defined schedule, to deliver the facsimile message.

Figure 3:
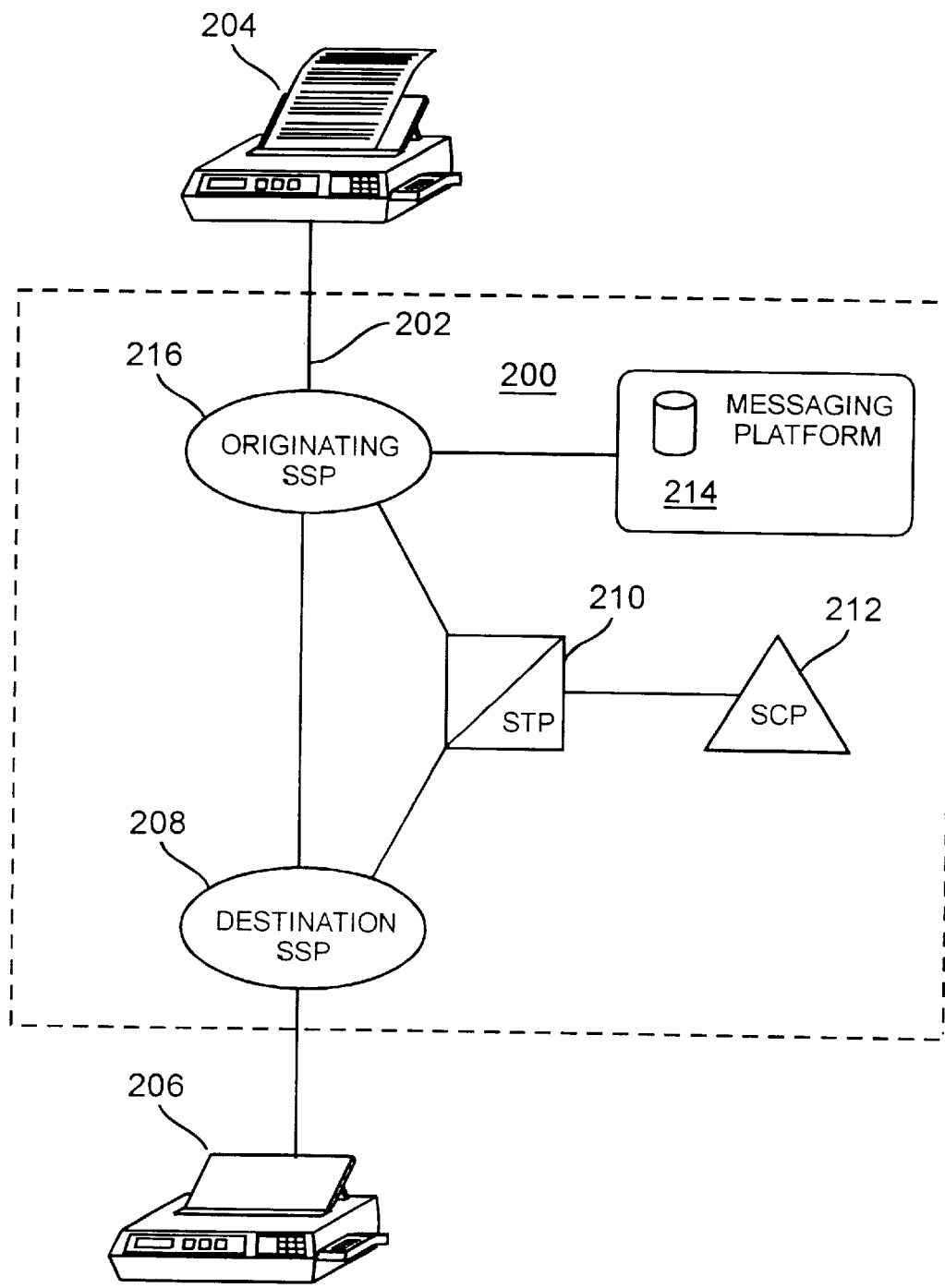
FIG. 3 presents a block diagram representation of a telecommunication system in accordance with an alternative embodiment of the present invention.

FIG. 3 presents a block diagram representation of a telecommunication system in accordance with an alternative embodiment of the present invention. In this embodiment the various methods described herein can also be implemented. In particular, a telecommunication system 200 is included for transmitting a facsimile message from a line 202 of an originating party, corresponding to an originating fax machine 204, to a destination having a destination fax machine 206 using an advanced intelligent telecommunication network such as the SS7 network. In a preferred embodiment the 0.2 AIN system features are used in the implementation of the system described herein.

The system includes an originating service switching point 216 for detecting an initiation of a telephone call on the telecommunications network to the destination by detecting an off-hook delay trigger assigned to the line 202 of the originating party and for suspending the telephone call and launching an information message if the off-hook delay trigger is detected. Destination service switching point 208 corresponds to the destination fax machine 206. Signaling transfer point 210 transfers messages to and from the originating service switching point and the destination service switching point and the service control point 212.

Service control point 212, through signaling transfer point 210, receives the information message from the originating service switching point 216, and in response, determines a destination condition for the destination. In one embodiment of the present invention, the SCP 212 launches a query to destination SSP 208 to determine the destination condition. The destination SSP 208 responds to the SCP 212 with a reply of either "busy" indicating the destination is currently on a call, "no-answer" indicating the destination does not pick-up the call or "answer" indicating that the destination picks-up the call and answers. The time that this destination condition was determined will be designated, the "first time".

If the destination condition was "answer" at the first time, the service control point 212 launches a transmit message to the originating service switching point to transmit the facsimile message to the destination. If, and only if the destination condition was "busy" or "no-answer" at the first time, the SCP 212 launches a routing message from the at least one service control point to the originating service switching point to route the telephone call. In this case, a messaging platform 214, capable of storing a plurality of facsimile messages, receives and stores the routed facsimile message. If the facsimile message was routed to the messaging platform, the messaging platform attempts to complete the call at a later time—designated as the "second time" and the messaging platform transmits the facsimile message to the destination if the destination condition was "answer" at the second time.

In one embodiment of the present invention a plurality of messaging platforms are provided, the service control point determines the telephone number corresponding to the message platform using a lookup-table that is indexed by a telephone number corresponding to the calling party. The calling party number is passed to the SCP 212 from the originating SSP 216 via the information message. The SCP 212 looks up the calling party number in a database to find a corresponding number for the messaging platform 214 that serves that particular calling party. The SCP 212 then effectuates the routing of the facsimile message to the messaging platform 214 by sending a routing message to originating SSP 216 that includes the telephone number of the messaging platform 214. The called party field for the call in the SS7 protocol is changed from the destination telephone number to the number for the messaging platform 214. More particularly, the original called party number is assigned to the redirecting party ID field.

In one embodiment of the present invention the system described above is implemented as follows. The information message sent by the originating service switching point 216 to the service control point 212 includes a Information Collected Query as allowed in the 0.2 AIN protocol. In this embodiment, the service control point 212 determines the destination condition by sending an Analyze Route Message (including a Next Event List) to the destination service switching point 208. Once a response is received by the service control point 212, the service control point 212 returns the Analyze Route Message to the originating service switching point 216. If the destination condition was "busy" or "no answer" then the Analyze Route Message includes the telephone number of the messaging platform 214.

In the embodiments of the present invention described above, the facsimile message is stored and forwarded for all destinations that are in a busy or no answer condition that originate from a calling party that subscribes to the particular service. In an alternative embodiment, each subscriber has an option of providing a list of priority numbers for which the service would apply. In this embodiment, the service would only be invoked in busy or no answer calls made to the destinations on this list. Other calls would be treated normally, without the invocation of this store and forward service.

In one embodiment of the present invention, the originating service switching point 216 may route the facsimile message to the messaging platform 214 directly, or by means of the telephone network (not shown).

It is worthwhile to note that the destination service switching point 208 is not necessary for the operation of the method in accordance with the present invention. One example of when the destination service switching point would not be necessary is when the originating party and the destination are both served by the same central office.

Figure 4:
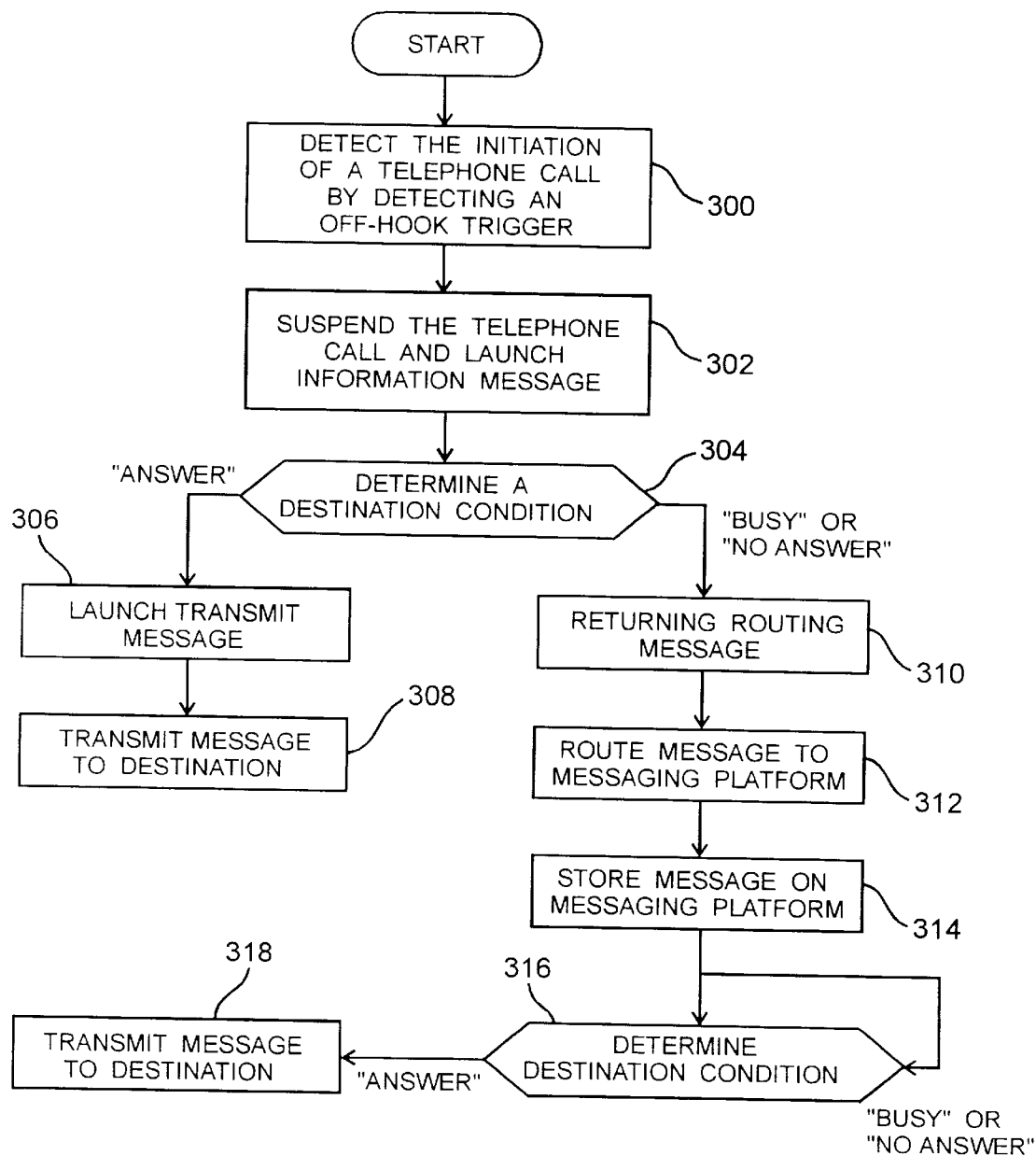
FIG. 4 presents a flowchart representation of a method in accordance with the present invention.

FIG. 4 presents a flowchart representation of a method in accordance with the present invention. The method further describes an embodiment of the present invention used in the operation of the system shown in FIG. 3. In particular, a method is presented for transmitting a facsimile message from a line of an originating party to a destination using an advanced intelligent telecommunication network having a plurality of service switching points including an originating service switching point and a destination service switching point, and at least one service control point, and a messaging platform capable of storing a plurality of facsimile messages.

The method begins in step 300 by detecting an initiation of a telephone call on the telecommunications network to the destination, by detecting an off-hook delay trigger assigned to the line of the originating party. In step 302, the telephone call is suspended and an information message is launched from the originating service switching point to the at least one service control point if the off-hook delay trigger is detected. In step 304, a destination condition is determined for the destination at a first time using the at least one service control point.

In step 306, if the destination condition is answer, a transmit message is launched from the at least one service control point to the originating service switching point to transmit the facsimile message, as shown in step 308, to the destination.

If the destination condition is "busy" or "no answer" a routing message is returned as shown in step 310 from the at least one service control point to the originating service switching point to route the telephone call to the messaging platform as shown in step 312. If the facsimile message was routed to the messaging platform, the routed facsimile message is stored on the messaging platform as shown in step 314. In step 316 a destination condition is determined at a second time. If the destination condition at the second time is "answer", the facsimile message is transmitted to the destination as shown in step 318. If the destination condition was "busy" or "no answer" the method returns to step 316 (optionally after some delay) to determine the destination condition again.

Figure 5:
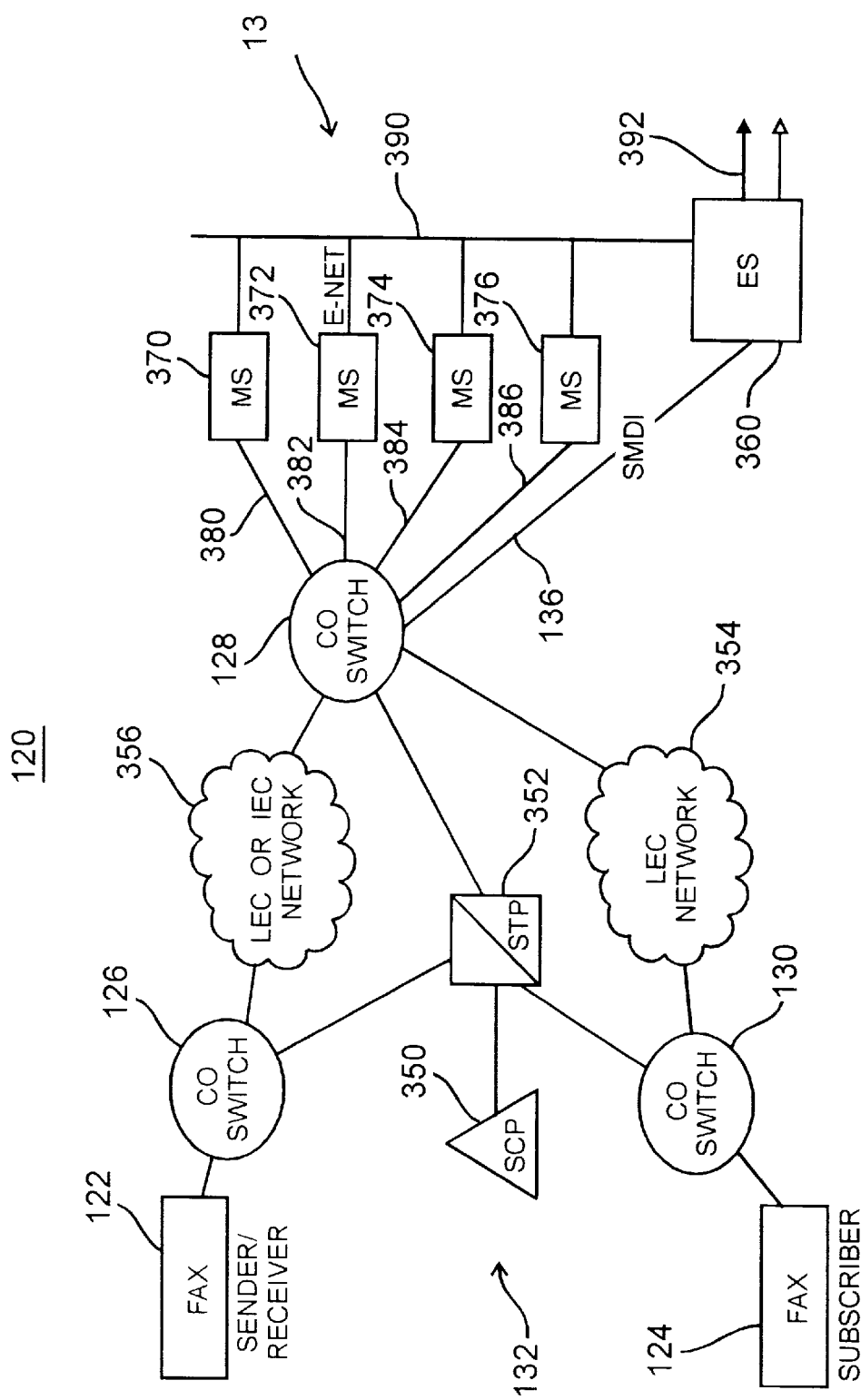
FIG. 5 presents a block diagram representation of a telecommunication system in accordance with a further embodiment of the present invention.
Figure 6:
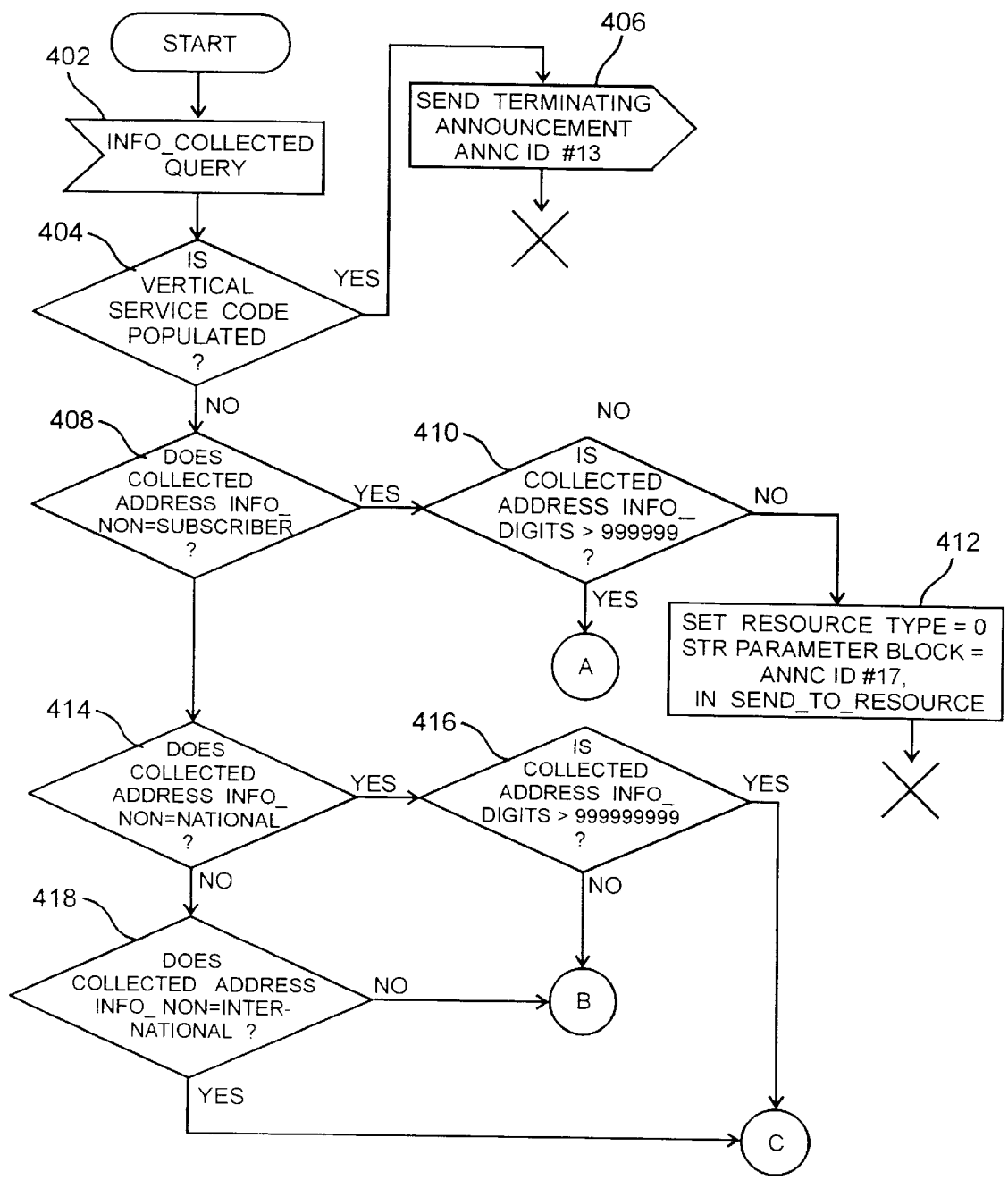
FIGS. 6–9 present flowchart representations in accordance with a further embodiment of the present invention.
Figure 7:
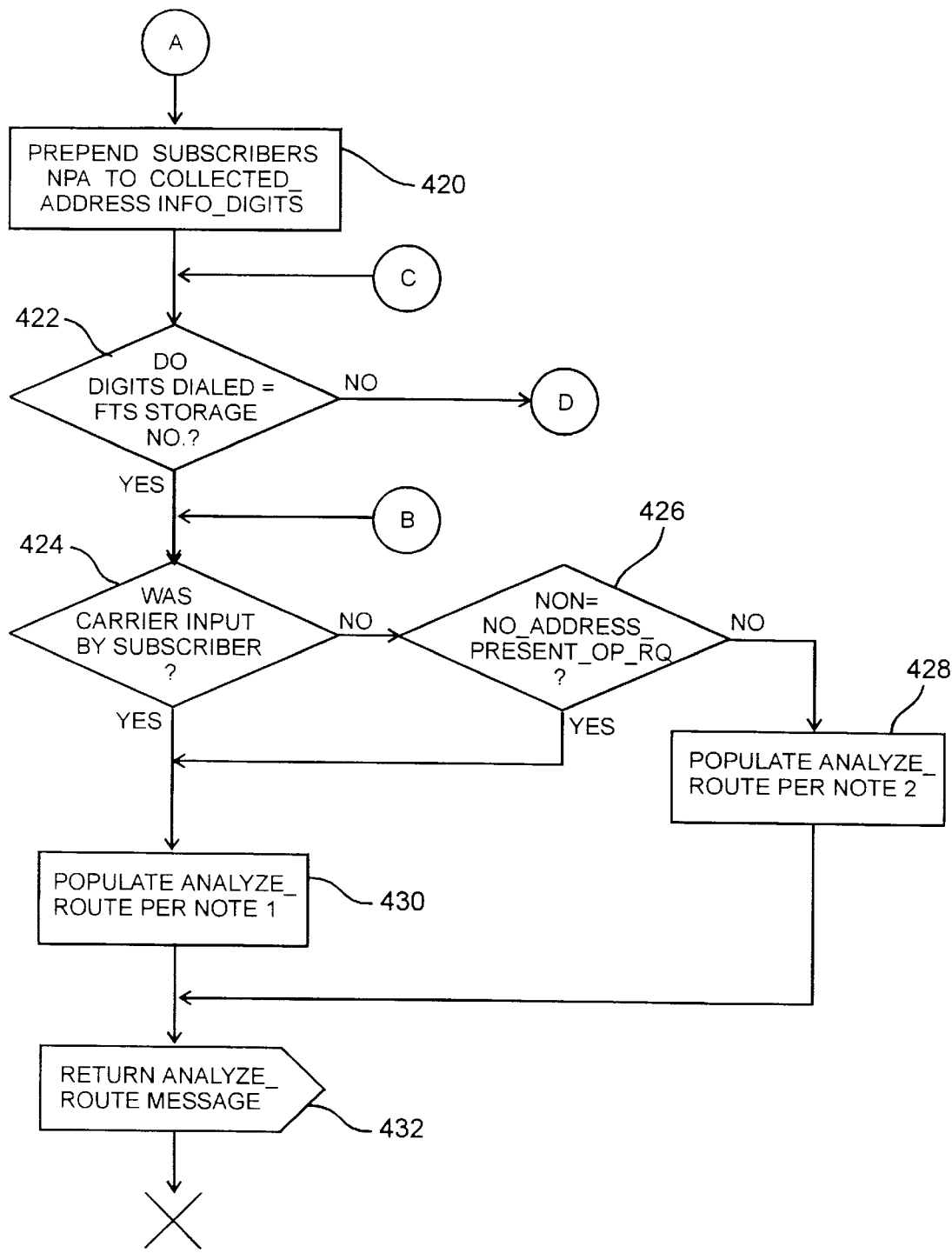
Figure 8:
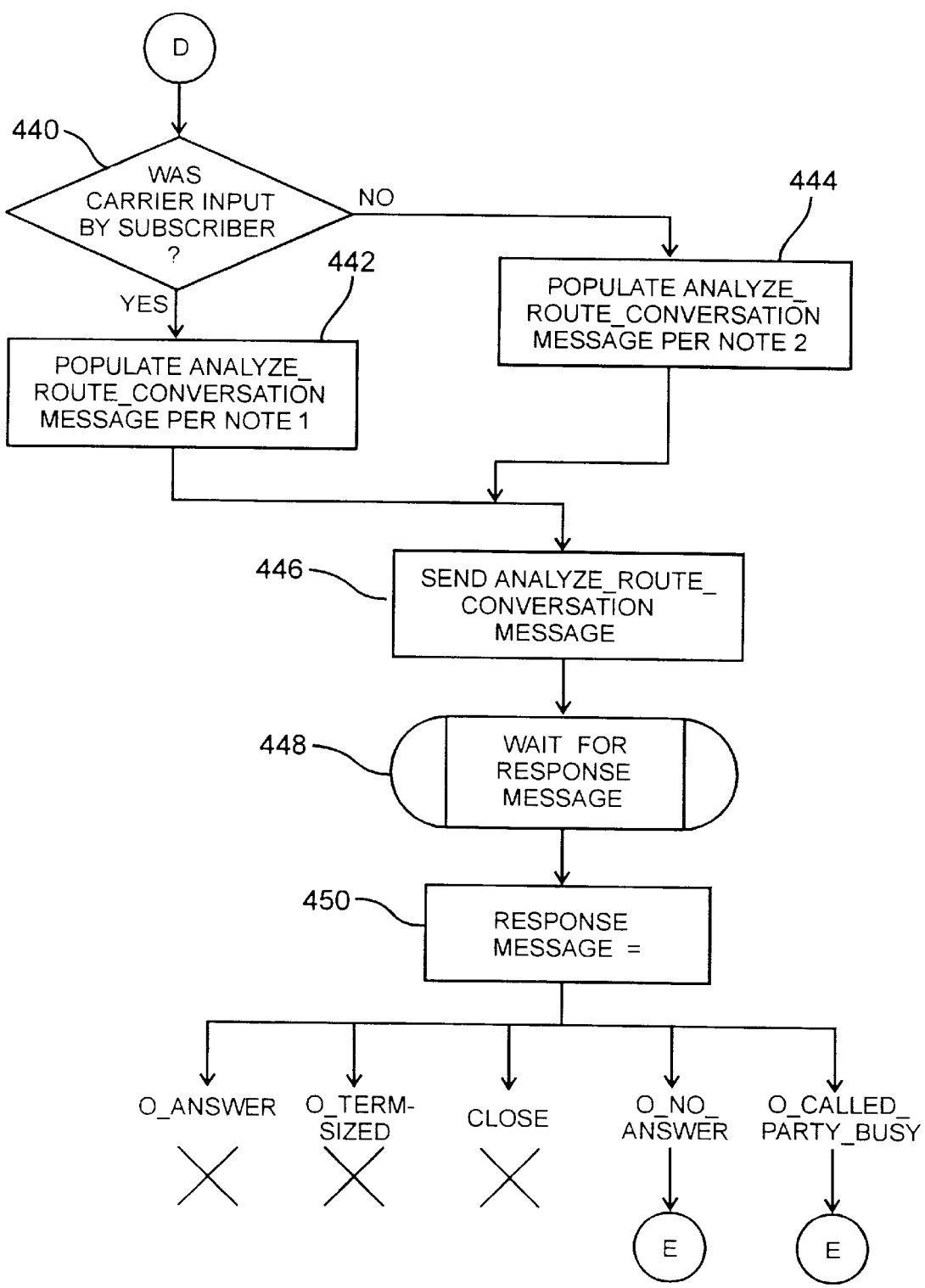
Figure 9:
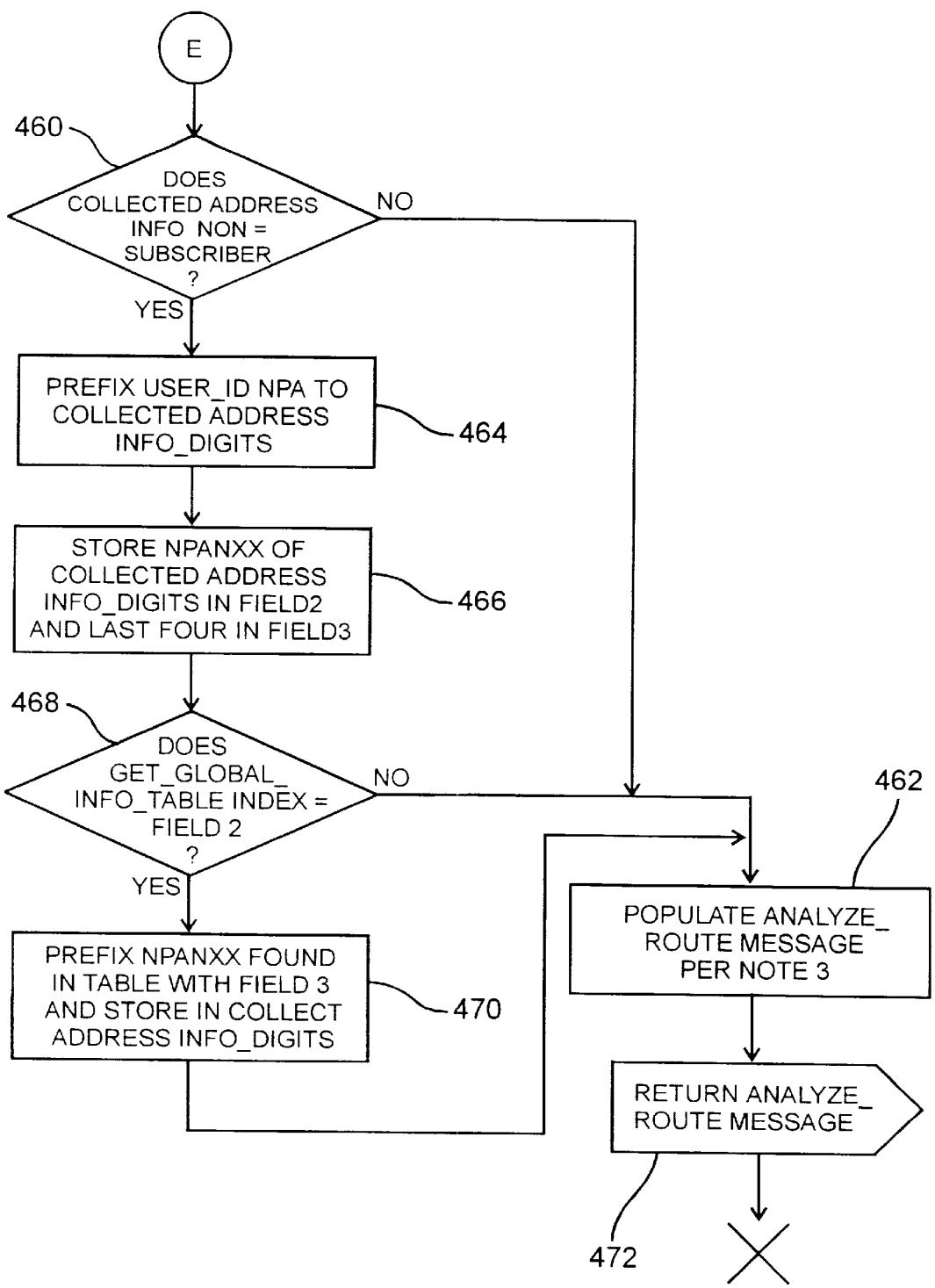

FIG. 5 presents a block diagram representation of a telecommunication system in accordance with a further embodiment of the present invention. As in the embodiments described in conjunction with FIG. 2, telecommunication system 120 is provided to route a facsimile message from subscriber fax unit 122 to fax recipient 124. Telecommunication system 120 includes central office switches 126, 128 and 130 that are interconnected via network 132. Network 132 includes service control point 350, signaling transfer point 352, local exchange carrier network 354 network 356 (that can be either a local exchange carrier network or a interexchange carrier network). These elements are interconnected by Signaling System 7 trunks.

Messaging platform 134 is provided and is connected to central office switch 128 by means of a multiline hunt group (MLHG) on T1 facilities associated with simplified message desk interface (SMDI) link 136. More particularly, the SMDI link 136 connects the central office switch 128 to a executive server 360 that coordinates the operation of the messaging platform 134 and provides billing, provisioning and administrative information via packet network connection 392. In addition, the executive server provides a connection 394 to a maintenance and monitoring system (not shown) for maintenance purposes.

A plurality of media servers 370–376 are connected to the central office switch 128 by means of a like plurality of 2-way DID trunks on T1 facilities 380–386. The media servers 370–376 provide storage facilities for a plurality of stored facsimile messages. These media servers communicate with the executive server 360 by means of an ethernet local data network 390.

FIGS. 6–9 present flowchart representations in accordance with a further embodiment of the present invention. In particular, these flowcharts represent specific procedures to be performed by a service control point in response to an Information Collected Query from an originating service switching point. In step 402, an Information_Collected query is received by the service control point. If the called party number has a star code prefix this indicates a vertical service code. If a vertical service code is detected in step 404, then the service control point returns an announcement number to the originating service switching point to play a message to the user as shown in step 406, such as a fast busy signal, indicating that the caller has entered an incorrect sequence for this service and control of the call is returned to the service switching point. If no vertical service code is detected, the method proceeds to step 408.

In an alternative embodiment of the present invention, a vertical service code could be used to activate or deactivate a feature of the service. In particular, the service itself may be activated or deactivated on either a sustained or call-by-call basis.

In step 408, the service control point checks the called party number to determine if the called party is a subscriber to the service. If the called party number corresponds to a service subscriber the service control point then checks to see if the called party number has at least 7 digits. This is performed by determining if the called party number is greater than 999999 as shown in step 410. If the called party number is not greater than 999999, then the service control point returns an announcement, as shown in step 412, and control of the call to the originating service switching point. In response, the service switching point plays a message to the user that indicates that the particular call cannot be completed as dialed. If the called party number is greater than 999999, the method proceeds to step 420.

If the called party number does not correspond to a subscriber number, the method proceeds to step 414 where the service control point determines if the called party number starts with a one and includes a valid area code. If so, the called party number is checked to see if it conforms to the national numbering plan (the form area code+seven digit number, which may optionally be preceeded by a "1"). This step is performed as shown in step 416 by determining if the called party number is greater than 999999999. If so, the method proceeds to step 422. If not, the method proceeds to step 424.

If the prefix of the called party number does not correspond to a national number (a valid area code which may optionally be preceeded by a "1") in step 414, the method proceeds to step 418 where the service control point determines if a valid international number is present. If so, the method proceeds to step 422; if not, the method proceeds to step 424.

In step 420, the area code (NPA) is prepended to the called party number. In step 422, the service control point determines if the called party number corresponds to the messaging platform number—indicating that the user has attempted to send a message to the messaging platform directly. If this is the case, the method proceeds to step 424 to begin to handle the call without the application of the service. If the called party number does not correspond to the messaging platform, the method proceeds to step 440.

In step 424, the service control point determines if a particular interexchange carrier has been casually dialed by the calling party. If so, the method proceeds to step 430 and an analyze route message is populated as shown in note 1 of Table 1. If not, the service control point determines if an operator has been requested as shown in step 426. If no operator has been requested then the method proceeds to step 428 to populate the analyze route message as shown in note 2 in Table 1. If, however, an operator has been requested, then the method proceeds to step 430. In any case, as shown in step 432, this analyze route message is transmitted to the originating service switching point where control of the call is returned.

In step 440, the service control point determines if a particular interexchange carrier has been casually dialed by the calling party. If so, the method proceeds to step 442 and an analyze route message is populated as shown in note 1 of Table 1. If not, the method proceeds to step 444 to populate the analyze route message as shown in note 2 in Table 1. In either case, an analyze route conversation message is sent to the destination service switching point in an attempt to complete the call as shown in step 446. The service control point then waits for a response as shown in step 448. If the response from the destination service switching point is either "answer" indicating that the call has been answered, or "originating termination" indicating that the calling party has hung-up, or "close" indicating that the destination service switching point is no longer processing the call, then the control of the call is returned to the originating service switching point.

If the response from the destination service switching point is either "busy" or "no answer", the method proceeds to step 460. In step 460, the service control point determines if the calling party number corresponds to an inter NPA seven digit dialing case. If the calling party is not a subscriber number, or if the calling party number is ten digits, the method proceeds directly to step 462. If the calling party is a seven digit number, the method proceeds to step 464 where the messaging platform area code (NPA) is substituted for the calling party area code. In step 466, the called party number is stored in two fields; the area code and exchange in one field, field 2, and the last four digits of the called party number in another field, field 3. In step 468, the service control point determines if the area code and exchange stored in field 2 are present in a list of area code and exchange combinations which cannot occur per industry standard. If so, the method prepends field 3 with an area code and exchange which are determined from a lookup table, and continues to step 462. If not, the method proceeds directly to step 462. If the area code and exchange match the area code and exchange of the messaging platform, the method first proceeds to step 470 where the original four digits of the called party number are prepended with an area code and exchange that are determined from a look up table. In step 462, the analyze route message is populated as shown in note 3 of Table 1 and control of the call is returned to the originating service switching point. This routes the call to the messaging platform for storage if the calling party is a subscriber to the service.

The parameters of the analyze route message sent from the service control point to the originating service switching point and the analyze route conversation message sent from the service control point to the destination service switching point, as described above, are shown in Table 1. The ChargeNumber corresponds to the Automatic Number Identification (ANI) of the calling party. The CallingPartyID contains the Directory Number (DN) of the calling party. The ChargePartyStationType contains the calling station type. The ChargeNumber, the CallingPartyID and the ChargePartyStationType are all populated with information supplied by the originating service switching point to the service control point via an Info_Collected message. The CalledParty_Digits are populated by the DN of the called party in cases covered by notes 1 & 2 and by a number stored at a specific index number of an RC_Data_Tbl located at the service control point in cases covered by note 3. The Traveling Class Mark (TCM) is a class of service indicator used with SS7 trunking. The RedirectingPartyID contains the DN of the called party. The PrimaryCarrier corresponds to an identification code that identifies the primary carrier for the subscriber. The AMAslpID is a billing parameter used to bill a leg of the call.

Figure 10:
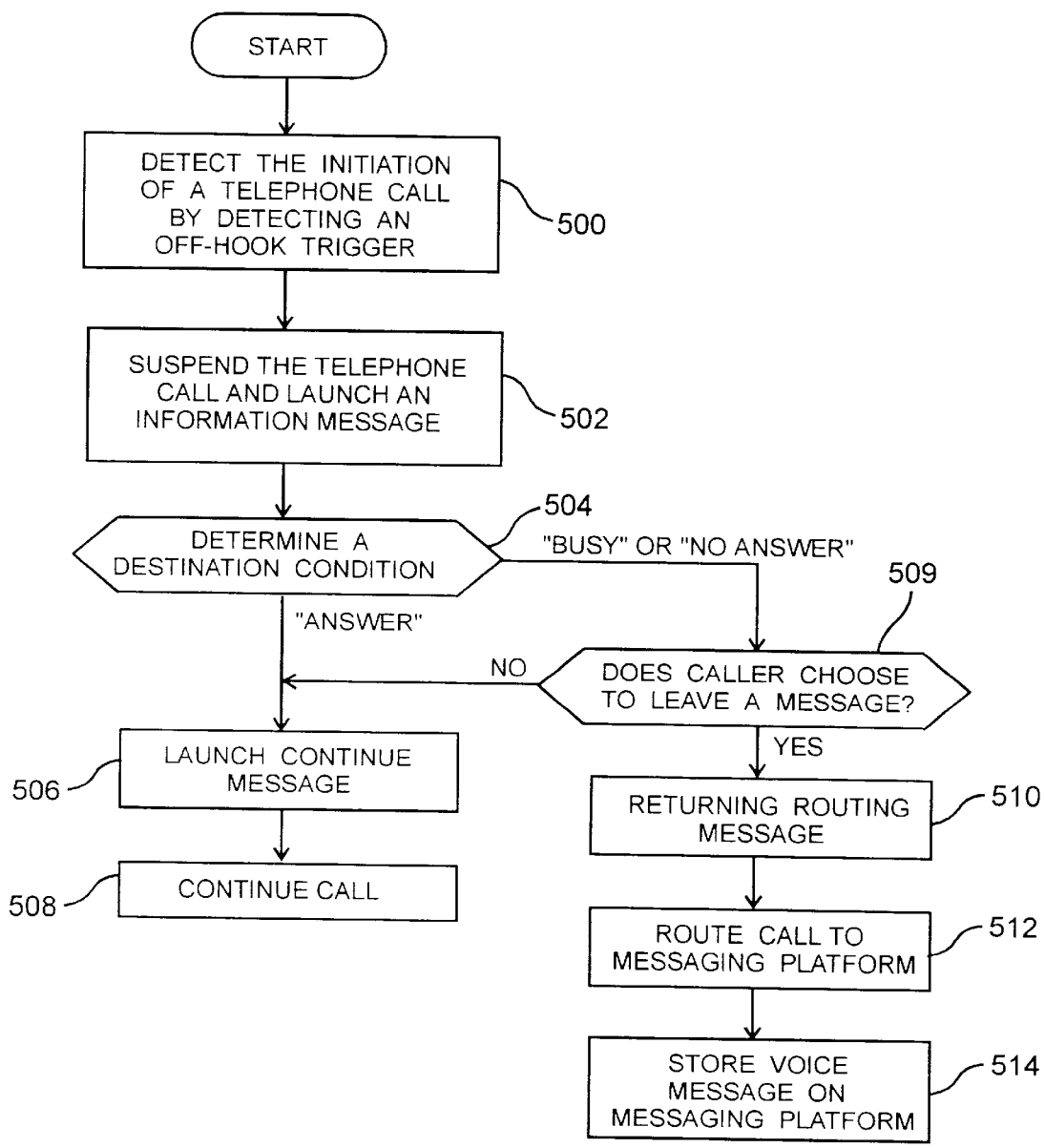
FIG. 10 presents a flowchart representation of a method in accordance with another embodiment of the present invention.

FIG. 10 presents a flowchart representation of a method in accordance with another embodiment of the present invention. In particular, this method is usable in conjunction with the systems described herein to transmit and store voice messages. The method begins in step 500 by detecting an initiation of a telephone call on the telecommunications network to the destination, by detecting an off-hook delay trigger assigned to the line of the originating party. In step 502, the telephone call is suspended and an information message is launched from the originating service switching point to the at least one service control point if the off-hook delay trigger is detected. In step 504, a destination condition is determined for the destination at a first time using the at least one service control point. In step 506, if the destination condition is answer, a continue message is launched from the at least one service control point to the originating service switching point to continue the telephone call, as shown in step 508, to the destination.

If the destination condition is "busy" or "no answer" the caller is queried as shown in step 509, using interactive response techniques, to determine if the caller would like to leave a voice message. If the caller indicates that no voice message will be left then the method proceeds to step 506 to continue the call. If, however, the caller indicates that a voice message will be left a routing message is returned as shown in step 510 from the at least one service control point to the originating service switching point to route the telephone call to the messaging platform as shown in step 512. If the call was routed to the messaging platform, the voice message is stored on the messaging platform as shown in step 514. This stored voice message is held for retrieval by an authorized person at the destination in a manner similar to standard voice mail systems.

Figure 11:
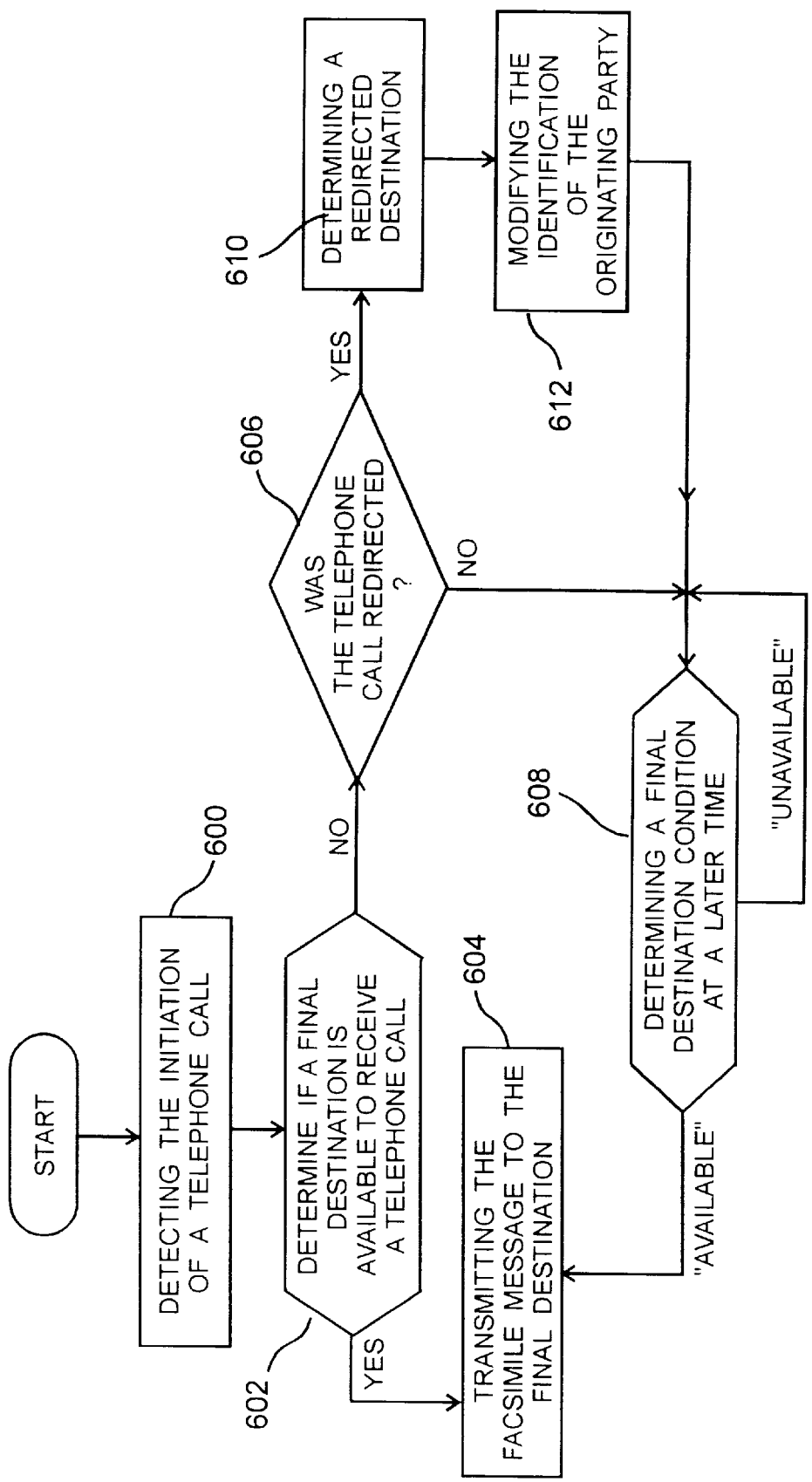
FIG. 11 presents a flowchart representation of a method in accordance with one embodiment of the present invention.

FIG. 11 presents a flowchart representation of a method in accordance with one embodiment of the present invention. This flowchart illustrates a method of transmitting a facsimile message using a public-switched telecommunications network, the public-switched telecommunications network having a messaging platform capable of storing a plurality of facsimile messages. The method starts in step 600 by detecting the initiation of a telephone call from an originating party on the telecommunications network to an original destination, where the content of the telephone call includes the facsimile message. Step 602 continues by determining if a final destination is able to receive the telephone call—the time of this determination being designated as the "first time"—where the final destination is the original destination if the call was not redirected, and the final destination is the final redirected destination if the telephone call was redirected at least one time. Here, the "final redirected destination" is referring to the final destination that a telephone call to the original destination has been redirected.

If the final destination is available at the first time, then the method proceeds to step 604 by transmitting the facsimile message to the final destination. If, however, the final destination is unavailable at the first time, the method proceeds as shown to step 606 by determining if the telephone call was redirected at least one time by a party redirecting the telephone call- this party to be known as a "redirecting party". A telephone call may be redirected using a service such as call forwarding, where the party receiving the telephone call determines to whom the call is forwarded.

If the telephone call was not redirected, the method proceeds to step 608, where it is determined again if the final destination is able to receive the telephone call—the time of this determination to be made after the "first time" and known as the "later time". If the final destination was able to receive the telephone call at the later time, corresponding to a destination condition of "available", then the method proceeds to step 604 and transmits the facsimile message to the final destination. If, however, the final destination is not able to receive a telephone call at the later time, corresponding to a destination condition of "unavailable", the method proceeds back to step 608 and continues to try again to find the final destination available.

If the telephone call was determined to be redirected at least one time in step 606, the method proceeds to step 610 by determining the redirected destination, where the redirected destination is the destination to which the called party has redirected the telephone call. The method then continues in step 612 by modifying the identification of the originating party. Step 612 is necessary in order to insure that any customer in the chain of redirected telephone calls who subscribes to the fax-thru service will receive the benefits of the service. After modifying the identification of the originating party, the method proceeds to step 608, and continues as previously discussed.

In one embodiment of the present invention, the number of times that the step 608 is repeated is limited to some finite number n. After trying n times to reach the destination, an error message, indicating that the facsimile message could not be sent to the final destination, is instead routed back to the originating fax. This avoids a potential problem where the destination, due to some fault or error, would not become available within a reasonable period of time. This also allows the user at the originating fax to know that the facsimile message did not go through, and gives the user the opportunity to check the number for the destination and possibly to check into the operation status of the fax machine at the destination.

In various embodiments employing busy triggers and no__answer triggers (discussed Infra in discussion for FIG. 20), steps 606, 610 and 612 are not necessary. In this embodiment, the method continues from step 602 directly to step 608 without determining whether the telephone call was redirected.

Figure 12:
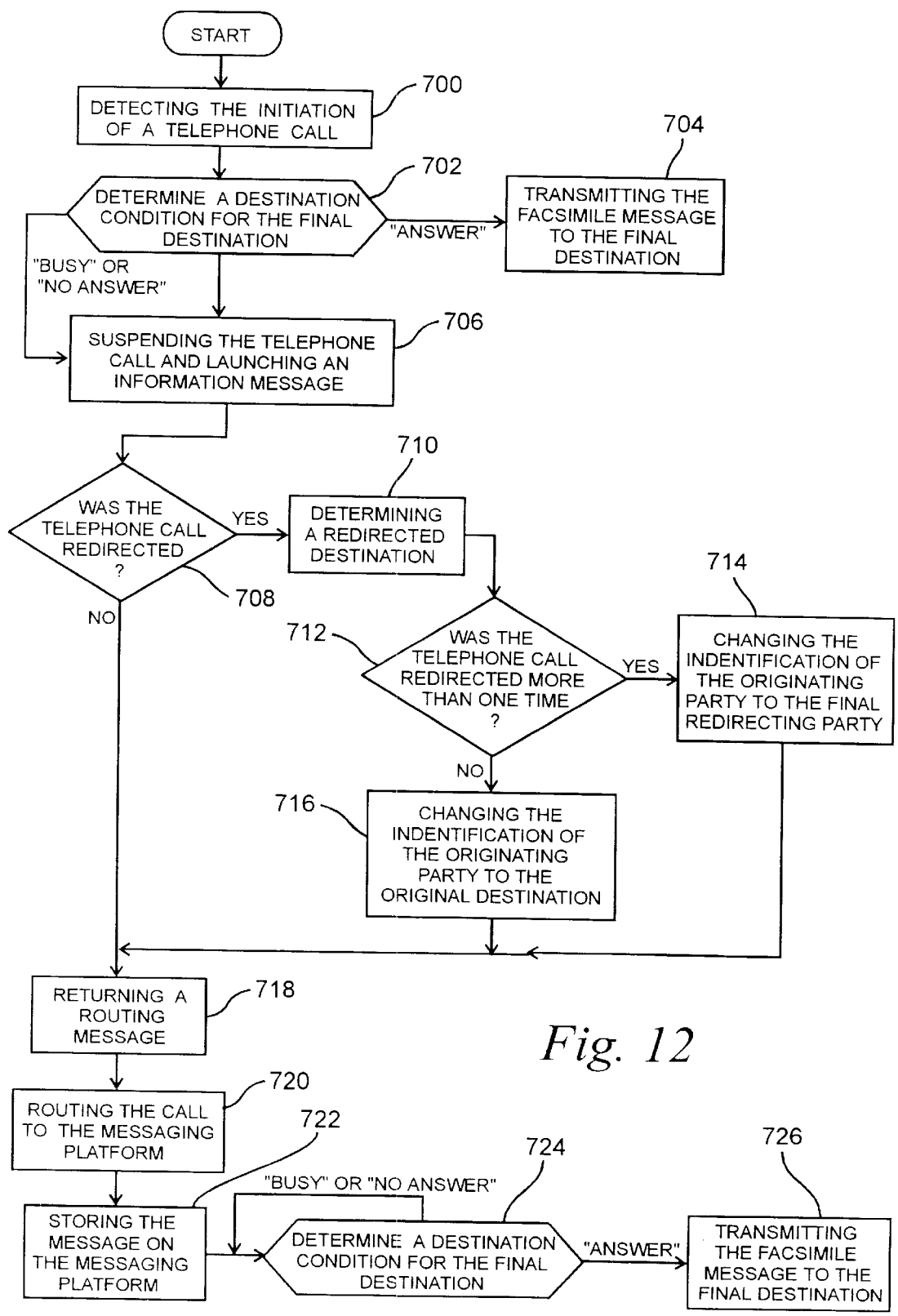
FIG. 12 presents a flowchart representation of a method in accordance with one embodiment of the present invention.

FIG. 12 presents a flowchart representation of a method in accordance with one embodiment of the present invention. The method further describes an enhanced embodiment of the present invention described in the flowchart of FIG. 11. In particular, a method is presented for transmitting a facsimile message from a line of an originating party to a destination using an advanced intelligent telecommunications network having a plurality of service switching points including an originating service switching point, at least one service control point, and a messaging platform capable of storing a plurality of facsimile messages.

The method begins in step 700 by detecting an initiation of a telephone call on the telecommunications network from an originating party to an original destination, with the content of the telephone call including the facsimile message. In step 702, the originating service switching point determines a destination condition for a final destination—the time of this determination being designated as the "first time"—where the final destination is the original destination if the telephone call was not redirected at least once, and the final destination is the final redirected destination if the telephone call was redirected at least one time. Here, the "final redirected destination" is referring to the final destination that a telephone call to the original destination has been redirected.

If the destination condition was determined to be "answer", the method proceeds to step 704, where the facsimile message is transmitted to the final destination. If, however, the destination condition is "busy" or "no__answer", the method continues to step 706, where the originating service switching point suspends the telephone call and launches an information message to the at least one service control point. The method then proceeds to step 708, where it is determined whether the telephone call was redirected by a redirecting party at least one time. If the telephone call was not redirected, the method proceeds to step 718 where the at least one service control point returns a routing message to the originating service switching point.

If the telephone call was determined to be redirected in step 708, the method continues on to step 710, where a redirected destination is determined. The "redirected destination" is the destination to which a called party has redirected the telephone call. The method then proceeds to step 712, where it is determined whether the telephone call was redirected more than one time. If the telephone call was redirected more than one time, the method proceeds to step 714, where the identification of the originating party is changed to that of the final party to redirect the telephone call—this final party to be referred to as the "final redirecting party". If the telephone call was not redirected more than one time, the method proceeds to step 716, where the identification of the originating party is changed to that of the original destination. In either case, the method continues on to step 718, where the at least one service control point returns a routing message to the originating service switching point.

The method then proceeds to step 720, where the originating service switching point routes the telephone call to the messaging platform. The method continues on to step 722, where the facsimile message is stored on the messaging platform. In step 724, a destination condition for the final destination is determined at a later time. If the destination condition at the later time is "answer", the facsimile message is transmitted to the final destination as shown in step 726. If the destination condition is "busy" or "no__answer", the method returns to step 724 (optionally after some delay) to determine the destination condition again.

In various embodiments employing busy triggers and no__answer triggers (discussed Infra in discussion for FIG. 20), steps 708–716 are not necessary. In this embodiment, the method continues from step 706 directly to step 718 without determining whether the telephone call was redirected.

Figure 13:
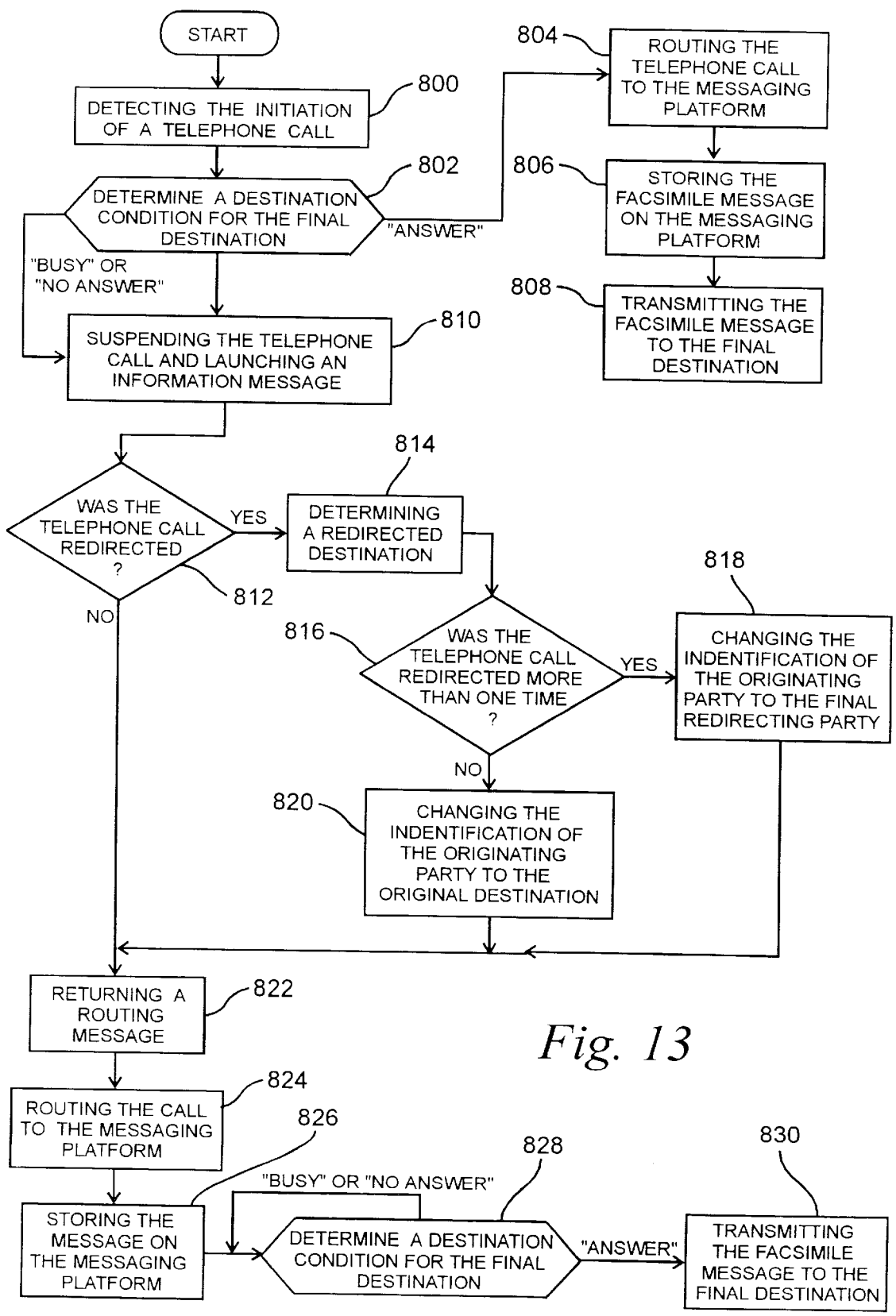
FIG. 13 presents a flowchart representation of a method in accordance with one embodiment of the present invention.

FIG. 13 presents a flowchart representation of a method in accordance with one embodiment of the present invention. The method further describes an enhanced embodiment of the present invention described in the flowchart of FIG. 11. In particular, a method is presented for transmitting a facsimile message from a line of an originating party to a destination using an advanced intelligent telecommunications network having a plurality of service switching points including an originating service switching point, at least one service control point, and a messaging platform capable of storing a plurality of facsimile messages.

The method begins in step 800 by detecting an initiation of a telephone call on the telecommunications network from an originating party to an original destination, with the content of the telephone call including the facsimile message. In step 802, the originating service switching point determines a destination condition for a final destination—the time of this determination being designated as the "first time"—where the final destination is the original destination if the call was not redirected, and the final destination is the final redirected destination if the telephone call was redirected at least one time. Here, the "final redirected destination" is referring to the final destination that a telephone call to the original destination has been redirected.

If the destination condition was determined to be "answer", the method proceeds to step 804, where the telephone call is routed to the messaging platform. The method then continues to step 806, where the facsimile message is stored on the messaging platform. The facsimile message is then transmitted to the final destination as shown in step 808. If the destination condition was determined to be "busy" or "no_answer" at the first time, the method proceeds to step 810, where the originating service switching point suspends the telephone call, and launches an information message to the at least one service control point. Steps 810 thru 830 are identical to the corresponding steps 706 thru 726 shown in FIG. 12.

It should be noted that the difference between the embodiment shown in FIG. 12, and the embodiment shown in FIG. 13 is the result of what happens if an "answer" condition is detected in steps 702 and 802 respectively. The embodiment as shown in FIG. 12 transmits the facsimile message to the final destination without storing the facsimile message on the messaging platform. The embodiment as shown in FIG. 13 stores the facsimile message on the messaging platform, and then transmits the facsimile message to the final destination. Hence, the embodiment shown in FIG. 12 stores the facsimile message on the messaging platform only if a "busy" or "no_answer" condition is detected at the first time, whereas, the embodiment shown in FIG. 13 always stores the facsimile message on the messaging platform, regardless of the destination condition at the first time.

In various embodiments employing busy triggers and no_answer triggers (discussed Infra in discussion for FIG. 20), steps 812–820 are not necessary. In this embodiment, the method continues from step 810 directly to step 822 without determining whether the telephone call was redirected.

Figure 14:
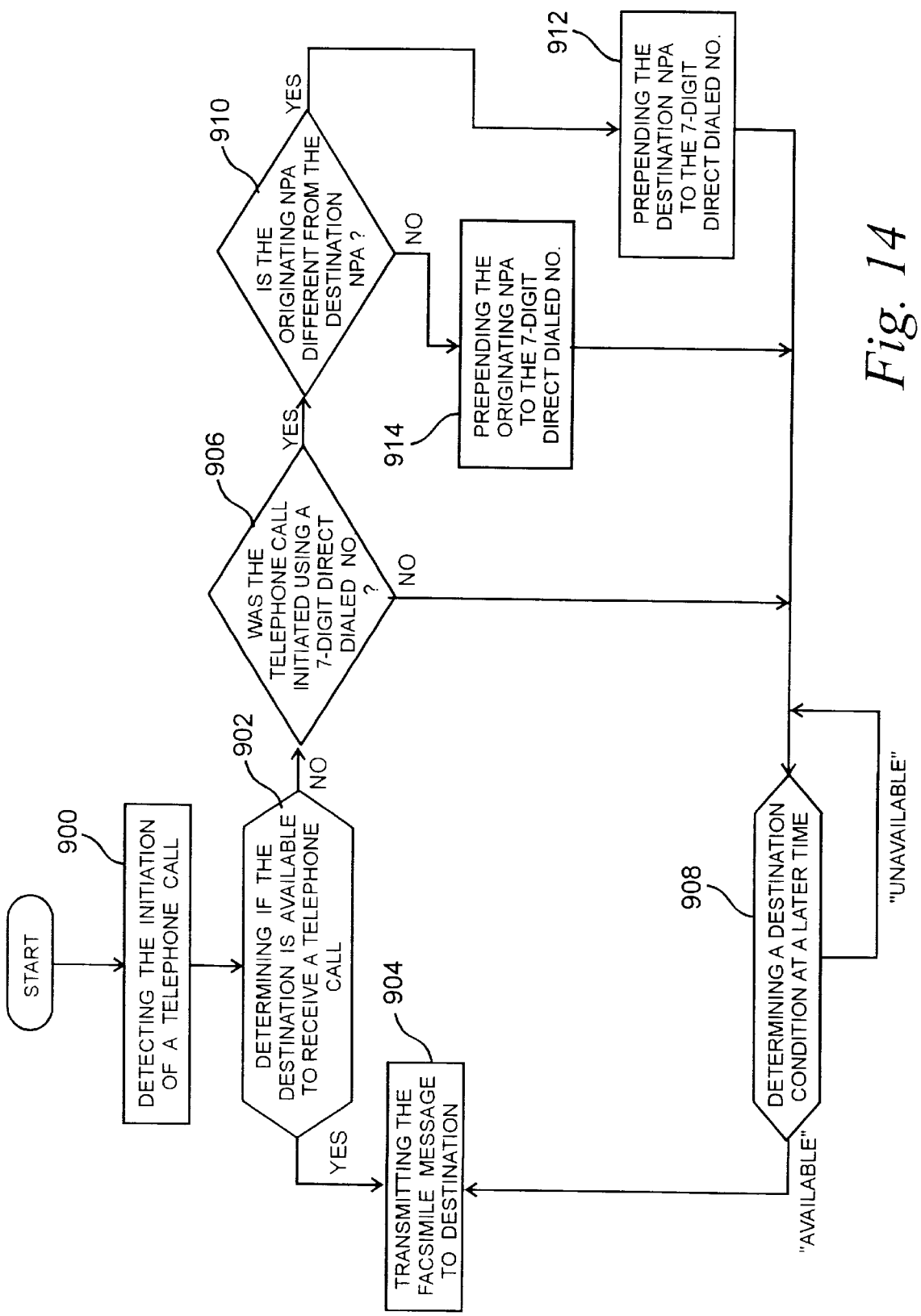
FIG. 14 presents a flowchart representation of a method in accordance with one embodiment of the present invention.

FIG. 14 presents a flowchart representation of a method in accordance with one embodiment of the present invention. This flowchart illustrates a method of transmitting a facsimile message using a public-switched telecommunications network, the public-switched telecommunications network having a messaging platform capable of storing a plurality of facsimile messages. The method starts in step 900 by detecting the initiation of a telephone call from an originating party on the telecommunications network to a destination, where the content of the telephone call includes the facsimile message. Step 902 continues by determining if the destination is able to receive the telephone call—the time of this determination being designated as the "first time".

If the destination is available at the first time, then the method proceeds to step 904 by transmitting the facsimile message to the destination. If, however, the destination is unavailable at the first time, the method proceeds as shown to step 906 by determining if the telephone call was initiated using a seven digit direct dialed telephone number.

If the telephone call was not initiated using a seven digit direct dialed telephone number, the method proceeds to step 908, where the destination condition is determined—the time of this determination to be known as the "later time". If the destination condition is "available" at the later time, then the method proceeds to step 904 and transmits the facsimile message to the destination. If, however, the destination is "unavailable" at the later time, the method proceeds back to step 908 and continues to try again to find the destination available.

If the telephone call was initiated using a seven digit direct dialed telephone number, the method proceeds to step 910, where it is determined whether the NPA corresponding to the originating party, which is known as the "originating NPA", is different from the NPA corresponding to the destination, which is known as the "destination NPA". If the originating NPA is determined to be different from the destination NPA, the method proceeds to step 912, where the destination NPA is prepended to the seven digit direct dialed telephone number. If, however, the originating NPA is determined to be the same as the destination NPA, the method proceeds to step 914, where the originating NPA is prepended to the seven digit direct dialed telephone number. In either case, the method then continues on to step 908, and continues as previously discussed.

In one embodiment of the present invention, the number of times that the step 908 is repeated is limited to some finite number n. After trying n times to reach the destination, an error message, indicating that the facsimile message could not be sent to the destination, is instead routed back to the originating fax. This avoids a potential problem where the destination, due to some fault or error, would not become available within a reasonable period of time. This also allows the user at the originating fax to know that the facsimile message did not go through, and gives the user the opportunity to check the number for the destination and possibly to check into the operation status of the fax machine at the destination.

Figure 15:
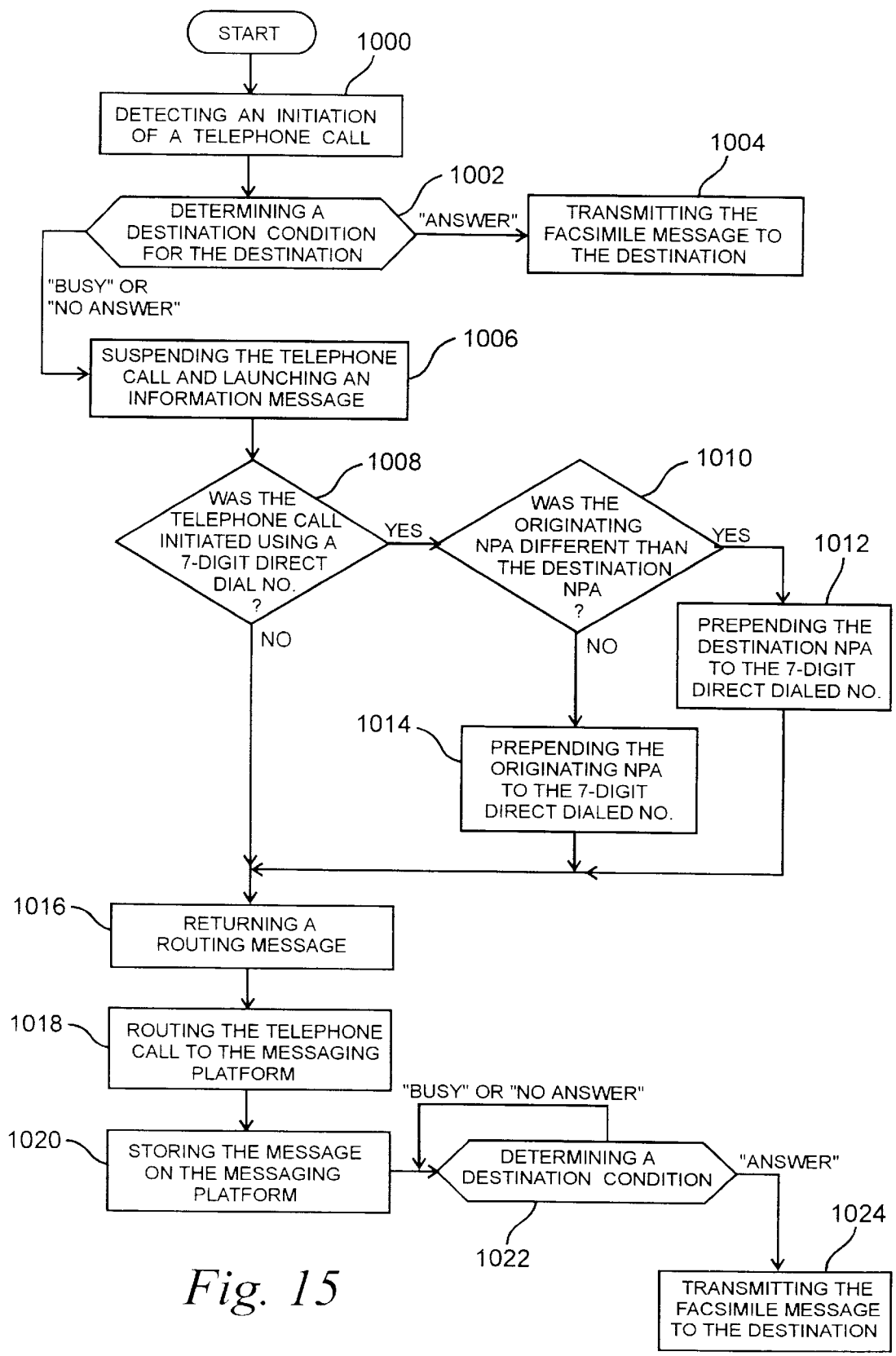
FIG. 15 presents a flowchart representation of a method in accordance with one embodiment of the present invention.

FIG. 15 presents a flowchart representation of a method in accordance with one embodiment of the present invention. The method further describes an enhanced embodiment of the present invention described in the flowchart of FIG. 14.

In particular, a method is presented for transmitting a facsimile message from a line of an originating party to a destination using an advanced intelligent telecommunications network having a plurality of service switching points including an originating service switching point, at least one service control point, and a messaging platform capable of storing a plurality of facsimile messages.

The method begins in step 1000 by detecting an initiation of a telephone call on the telecommunications network from an originating party to a destination, with the content of the telephone call including the facsimile message. In step 1002, the service switching point determines a destination condition for the destination—the time of this determination being designated as the "first time".

If the destination condition was determined to be "answer", the method proceeds to step 1004, where the facsimile message is transmitted to the destination. If, however, the destination condition is "busy" or "no_answer", the method continues to step 1006, where the originating service switching point suspends the telephone call and launches an information message to the at least one service control point. The method then proceeds to step 1008, where it is determined whether the telephone call was initiated using a seven digit direct dialed telephone number. If the telephone call was not initiated using a seven digit direct dialed telephone number, the method proceeds to step 1016 where the at least one service control point returns a routing message to the originating service switching point.

If the telephone call was determined to be initiated using a seven digit direct dialed telephone number, the method proceeds to step 1010, where it is determined whether the NPA corresponding to the originating party, which is known as the "originating NPA", is different from the NPA corresponding to the destination party, which is known as the "destination NPA". To determine if the originating NPA is different from the destination NPA, a lookup table comprising of a plurality of elements is used, and a linear search is performed on the elements of the lookup table.

The lookup table is comprised of at least two columns. The first column consists of impermissible NPA/NXX combinations of seven digit direct dialed telephone numbers between adjacent NPAs. The second column corresponds to the first column, and consists of the correct NPA/NXX combinations for the impermissible NPA/NXX combinations listed in the first column.

The linear search is performed on the elements of the lookup table by first creating an NPA/NXX search string. The NPA/NXX search string is created by combining the originating NPA with the NXX corresponding to the destination telephone number. The NPA/NXX search string is then compared with the elements of the first column of the lookup table. A match between the NPA/NXX search string and an element of the first column of the lookup table indicates that the originating party and the destination are located in different NPAs. If there is not a match between the first column of the lookup table and the NPA/NXX search string, the originating party and destination are located within the same NPA.

If it is determined in step 1010 that the originating NPA is different from the destination NPA, the method continues to step 1012 where the destination NPA is prepended to the seven digit direct dialed telephone number. This is done by utilizing a memory location, the contents of the memory location consisting of the final four digits of the destination telephone number. After the match in step 1010 is found between the NPA/NXX search string and the first column of the lookup table, the corresponding correct NPA/NXX combination is copied from the second column of the lookup table. This correct NPA/NXX combination is prepended to the memory location, creating the ten digit telephone number to be sent to the messaging platform. The method then continues to step 1016 where the at least one service control point returns a routing message to the originating service switching point.

If it is determined that the originating NPA is not different than the destination NPA in step 1010, then the method continues to step 1014, where the originating NPA is prepended to the seven digit direct dialed telephone number. This is done by utilizing a memory location, the contents of the memory location consisting of the final four digits of the destination telephone number. The NPA/NXX search string is then prepended to the memory location, creating the ten digit telephone number to be sent to the messaging platform. The method then continues to step 1016 where the at least one service control point returns a routing message to the originating service switching point.

The method continues on to step 1018, where the originating service switching point routes the telephone call to the messaging platform. The method proceeds to step 1020, where the facsimile message is stored on the messaging platform. In step 1022, a destination condition for the destination is determined at a later time. If the destination condition at the later time is "answer", the facsimile message is transmitted to the destination as shown in step 1024. If the destination condition is "busy" or "no_answer", the method returns to step 1022 (optionally after some delay) to determine the destination condition again.

In various embodiments of the present invention employing busy triggers and no answer triggers (discussed Infra in discussion for FIG. 20), steps 1008–1014 are not needed. In this embodiment, the method continues from step 1006 directly to step 1016 without determining whether the telephone call was initiated using a seven digit direct dialed telephone number.

Figure 16:
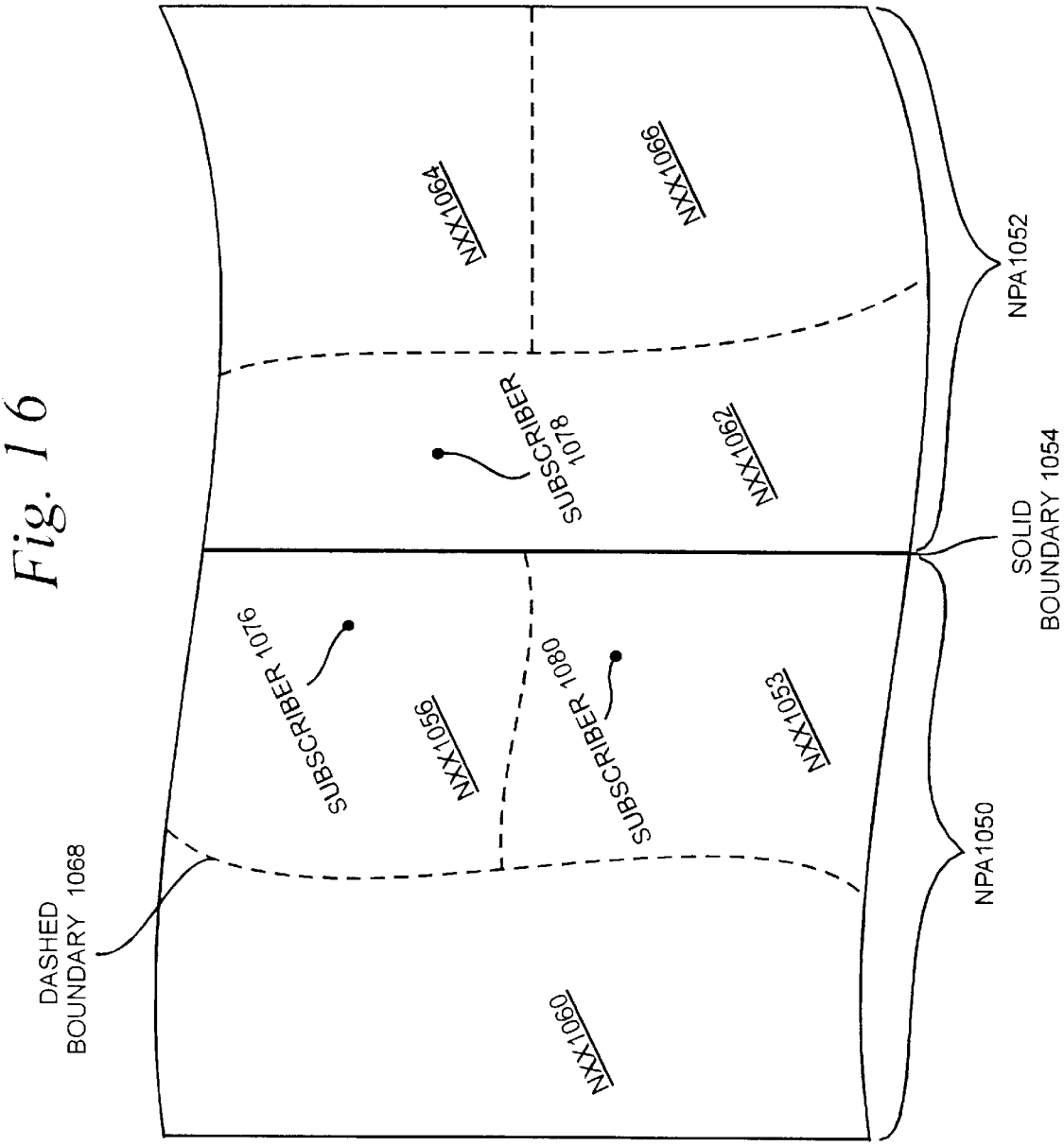
FIG. 16 presents an example service area map in accordance with one embodiment of the present invention.

FIG. 16 presents an example service area map in accordance with one embodiment of the present invention. The operations of the method of FIG. 15 will be described in the context of the example service area shown in FIG. 16.

FIG. 16 shows two adjacent NPAs, NPA1050 and NPA1052, separated by a solid boundary 1054. Within NPA1050, there are three NXXs shown as NXX1056, NXX1058, and NXX1060. Within NPA1052, there exists three additional NXXs shown as NXX1062, NXX1064 and NXX1066. The NXXs within each NPA are separated by dashed bounderies which look like boundary 1068. Within the NXX1056, there resides a subscriber 1076. Within the NXX1062 resides a subscriber 1078. Within the NXX1058 resides a subscriber 1080. The ten digit telephone number of Subscriber 1076 may be represented by (NPA1050) NXX1056-XXXX, where NPA1050 is the three digit area code in which subscriber 1076 resides, NXX1056 is the three digit exchange in which subscriber 1076 resides, and XXXX represents a final four digits of the telephone number for subscriber 1076. In the same manner, the ten digit telephone numbers of subscriber 1078 and subscriber 1080 would be represented as (NPA1052) NXX1062-XXXX and (NPA1050) NXX1058-XXXX respectively.

In operation, the method determines whether the originating NPA is different than the destination NPA. To understand the purpose for this step, it is important to first understand that as between two adjacent NPAs, if a specific NXX is used in the first NPA, that same NXX may be repeated in the second, adjacent NPA only if the following two conditions are met in some cases. First, in some cases, all subscribers living in the first NPA must be unable to reach both the NXX in the first NPA and that same NXX in the second NPA via a seven digit direct dialed telephone number. Second, in some cases, all subscribers living in the second NPA must be unable to reach both the NXX in the second NPA and that same NXX in the first NPA via a seven digit direct dialed telephone number. This allows people who live in close proximity, yet in adjacent NPAs, to phone one another using a seven, rather than a ten digit telephone number.

Applying this to FIG. 16, generally, a subscriber in NPA1050 must dial a ten digit telephone number to contact a subscriber in NPA1052. However, if a subscriber in NPA1050 lives in close proximity to a subscriber in NPA1052, the call may be made using a seven digit telephone number instead. This is the case for subscribers living in NXX1056, NXX1058 and NXX1062. A subscriber living in NXX1056 may contact a subscriber living in NXX1062 by dialing a seven digit telephone number rather than a ten digit one. Likewise, a subscriber living in NXX1058 may contact a subscriber living in NXX1062 by dialing a seven digit telephone number. Thus, subscriber 1076 and subscriber 1080 may both contact subscriber 1078 using a seven digit telephone number, and subscriber 1078 is able to contact subscriber 1076 and subscriber 1080 via a seven digit direct dialed telephone number.

Since NXX1056 is used in NPA1050, it cannot also be repeated in NPA1052. If NXX1056 was used in NPA1052, it would violate the second condition above as subscriber 1078 would be able to reach both NXX1056 located in NPA1050 and the NXX1056 which would be located in NPA1052 via a seven digit direct dialed telephone number. It would be permissible, however, for NXX1064 to be repeated in both NPA1050 and NPA1052 if, hypothetically, the three digit exchange representing NXX1064 were to replace NXX1060, since both of the above conditions would be met. The first condition would be met because although subscriber 1076 is able to reach the NXX1064 located in NPA1 via a seven digit direct dialed telephone number, subscriber 1076 cannot reach the NXX1064 located in NPA1052 via a seven digit direct dialed telephone number.

Similarly, subscriber 1078 is able to reach the NXX1064 located in NPA1052 via a seven digit direct dialed telephone number, but would be unable to reach the NXX1064 which would, in this hypothetical, replace NXX1060 in NPA1050 via a seven digit direct dialed telephone number.

The purpose of determining whether the originating NPA is different than the destination NPA is to insure that the destination telephone number sent to the messaging platform, and later used by the messaging platform to deliver the facsimile message to the destination is a ten digit telephone number. This destination telephone number must be ten digits because the messaging platform may not be located in the same NPA as the destination. When the destination telephone number is a seven digit direct dialed telephone number, an NPA must be prepended to the seven digit direct dialed telephone number to create the ten digit telephone number needed by the messaging platform. In order to prepend the correct NPA to the seven digit direct dialed telephone number (which is the destination telephone number), it must be determined whether the destination is located in the same NPA as the originating party, or an adjacent NPA. If the destination is located in the same NPA as the originating party, the originating party NPA will be prepended to the seven digit direct dialed telephone number to create the ten digit telephone number needed by the messaging platform. If the destination is located in an adjacent NPA to the originating party, the adjacent NPA will be prepended to the destination telephone number.

Applying this concept to FIG. 16, if subscriber 1076 attempted to send a facsimile message to subscriber 1078, NPA1052 would be prepended to the seven digit telephone number dialed by subscriber 1076 to reach subscriber 1078. If subscriber 1076 attempted to send a facsimile message to subscriber 1080, NPA1050 would be prepended to the seven digit telephone number dialed by subscriber 1076 to reach subscriber 1080.

To determine whether the originating NPA is different than the destination NPA, a lookup table comprising of a plurality of elements is used, and a linear search is performed on the elements of the lookup table. First, the lookup table composition must be examined in greater detail. Next, it will be shown how the linear search is performed on the elements of the lookup table.

The lookup table, shown in Table 2, is comprised of at least two columns. The first column consists of every impermissible NPA/NXX combination between adjacent NPAs. The elements of the first column of the lookup table are impermissible because if the NPA/NXX combination did exist, it would fail to meet the two conditions previously stated for repeating NXXs in adjacent NPAs. The second column provides the corresponding correct NPA/NXX combinations for each impermissible NPA/NXX combination listed in the first column. The elements of the first column are in the form of 'NPA1050'/'NXX' and 'NPA1052'/'NXX', where 'NPA1050' and 'NPA1052' are the adjacent NPAs shown in FIG. 16, and 'NXX' represents every exchange located in NPA1050 and NPA1052 where a subscriber may dial to an NXX in an adjacent NPA using a seven digit telephone number rather than a ten digit telephone number. The elements of the second column are in the form of 'NPA1050'/'NXX' and 'NPA1052'/'NXX' where 'NPA1050' and 'NPA1052' are the adjacent NPAs shown in FIG. 16, and 'NXX' represents the exchanges listed in corresponding column 1 paired with its correct, or actual NPA in accordance with the conditions for repeating NXXs in adjacent NPAs. A specific example demonstrating the differences between column 1 and column 2 of the lookup table is as follows. Looking at the first NPA/NXX combination in column 1 of Table 2, "NPA1050/NXX1062", it is apparent that this combination of NPA and NXX cannot exist in a telephone number as NXX1062 cannot exist in NPA1050, and is therefore impermissible. This is because, as shown in FIG. 16, NXX1062 is located in an NPA adjacent to NPA1050 and if it was repeated in NPA 1050 as well, it would violate the first condition previously mentioned. In column 2, NXX1062 is paired with the second, adjacent NPA in which NXX1062 exists, thereby creating a permissible NPA/NXX combination, in accordance with the conditions for repeating NXXs in adjacent NPAs.

Now that the lookup table has been explained in greater detail, it will be shown how a linear search is performed on the elements of the lookup table.

The linear search is performed on the elements of the lookup table by first creating an NPA/NXX search string. The NPA/NXX search string is created by combining the NPA from the originating party with the NXX from the destination. The search string which would be created for FIG. 16 where subscriber 1076 (the originating party) attempts to send a fax to subscriber 1078 (the destination) would be "NPA/1050/NXX1062", because "NPA1050" is the NPA where the originating party is located, and "NXX1062" is the NXX for the destination. The search string created where subscriber 1076 attempts to send a fax to subscriber 1080 would be "NPA1050/NXX1058". The NPA/NXX search string is then used to perform a linear search on the elements of the lookup table.

A linear search is performed on the elements of the lookup table by comparing the NPA/NXX search string with the elements of the first column of the lookup table. A match between the elements of the first column of the lookup table and the NPA/NXX search string indicates that the originating NPA is different from (or adjacent to) the destination NPA. This is true because the first column of the lookup table lists every impermissible combination of NPA/NXX that exists between all adjacent NPAs. No match between the NPA/NXX search string and the elements of the first column of the lookup table indicates that the originating NPA must be the same as the destination NPA.

An example will demonstrate this. First, the search string created above where subscriber 1076 attempts to send a facsimile message to subscriber 1078 will be used in the linear search, the string being "NPA1050/NXX1062". (Recall that the NPA is taken from the originating party, and the NXX is taken from the destination) This search string is compared with the elements of the first column of the lookup table in TABLE 2, which lists the impermissible combinations of NPA/NXXs in a telephone call between NPA1050 and NPA1052. A match is found between the search string and the first element of the first column of the lookup table in TABLE 2. This match indicates that the NPA and the NXX which make up the search string cannot exist in the same NPA, and therefore, must exist in adjacent NPAs. Therefore, the NPA in the search string (taken from subscriber 1076) must be in a different NPA than the NXX in the search string (taken from subscriber 1078). This shows that subscriber 1076 and subscriber 1078 must be located in adjacent NPAs, not the same NPA. Conversly, when the search string where subscriber 1076 attempts to send a facsimile message to subscriber 1080 is used in the linear search ("NPA1050/NXX1058"), no match is found between this search string and the elements of the first column of lookup table in TABLE 2. This indicates that the NPA/NXX search string must be a permissible one, demonstrating that Subscriber 1076 and Subscriber 1080 are located within the same NPA.

If it is determined that the originating NPA is different than the destination NPA, the method prepends the destination NPA to the seven digit direct dialed telephone number. This step is done as follows. A memory location consisting of the final four digits of the destination telephone number is created. The lookup table shown in TABLE 2 and described above must then be used. Once a match is found between the NPA/NXX search string and an element of the first column of the lookup table, the correct NPA/NXX combination from the second column of the lookup table is copied from the lookup table and prepended to the memory location. This creates the complete destination ten digit telephone number needed by the messaging platform to deliver the facsimile message.

If it is determined that the originating NPA is the same as the destination NPA, the method prepends the originating NPA to the seven digit direct dialed telephone number. This is done by creating a memory location consisting of the final four digits of the destination telephone number. As stated above, the NPA/NXX search string is created from combining the originating NPA and the destination NXX. To prepend the originating NPA to the seven digit direct dialed telephone number, the NPA/NXX search string is prepended to the contents of the memory location. This will create the ten digit destination telephone number needed by the messaging platform to deliver the facsimile message.

Figure 17:
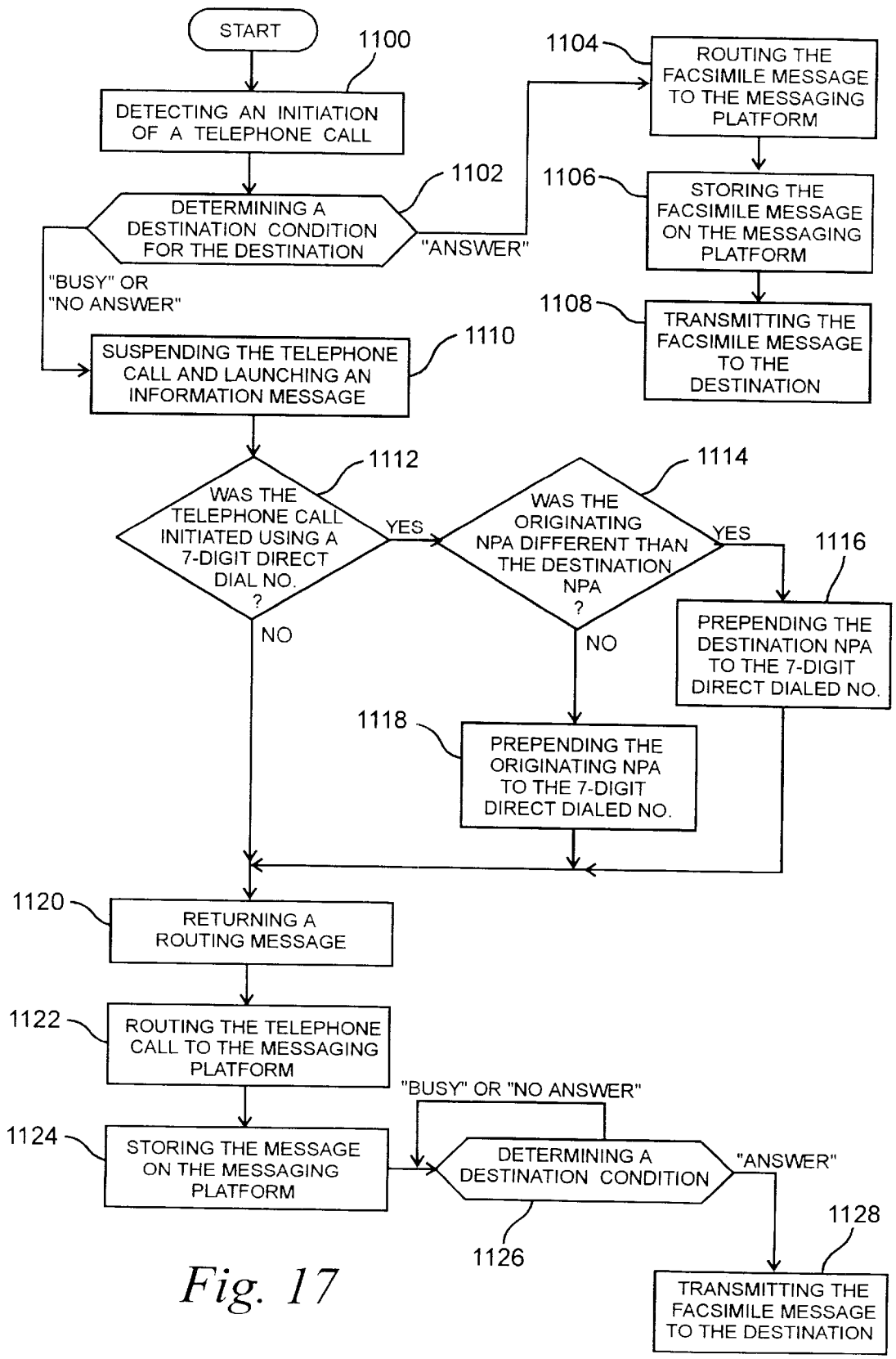
FIG. 17 presents a flowchart representation of a method in accordance with one embodiment of the present invention.

FIG. 17 presents a flowchart representation of a method in accordance with one embodiment of the present invention. The method further describes an enhanced embodiment of the present invention described in the flowchart of FIG. 14. In particular, a method is presented for transmitting a facsimile message from a line of an originating party to a destination using an advanced intelligent telecommunications network having a plurality of service switching points including an originating service switching point, at least one service control point, and a messaging platform capable of storing a plurality of facsimile messages.

The method begins in step 1100 by detecting an initiation of a telephone call on the telecommunications network from an originating party to a destination, with the content of the telephone call including the facsimile message. In step 1102, the service switching point determines a destination condition for the destination—the time of this determination being designated as the "first time".

If the destination condition was determined to be "answer", the method proceeds to step 1104, where the telephone call is routed to the messaging platform. The method then continues to step 1106, where the message is stored on the messaging platform, and is transmitted to the destination as shown in step 1108. If, however, the destination condition is "busy" or "no_answer", the method continues to step 1110, where the service switching point suspends the telephone call and launches an information message to the at least one service control point. Steps 1110 thru 1128 are identical to steps 1006 thru 1024 described in FIG. 15.

It should be noted that the difference between the embodiment shown in FIG. 15, and the embodiment shown in FIG. 17 is the result of what happens if an "answer" condition is detected in steps 1002 and 1102 respectively. The embodiment as shown in FIG. 15 transmits the facsimile message to the final destination without storing the facsimile message to the messaging platform. The embodiment as shown in FIG. 17 stores the facsimile message to the messaging platform, and then transmits the facsimile message to the final destination. Hence, the embodiment shown in FIG. 15 stores the facsimile message to the messaging platform only if a "busy" or "no_answer" condition is detected at the first time, whereas, the embodiment shown in FIG. 17 always stores the facsimile message to the messaging platform, regardless of the destination condition at the first time.

Figure 18:
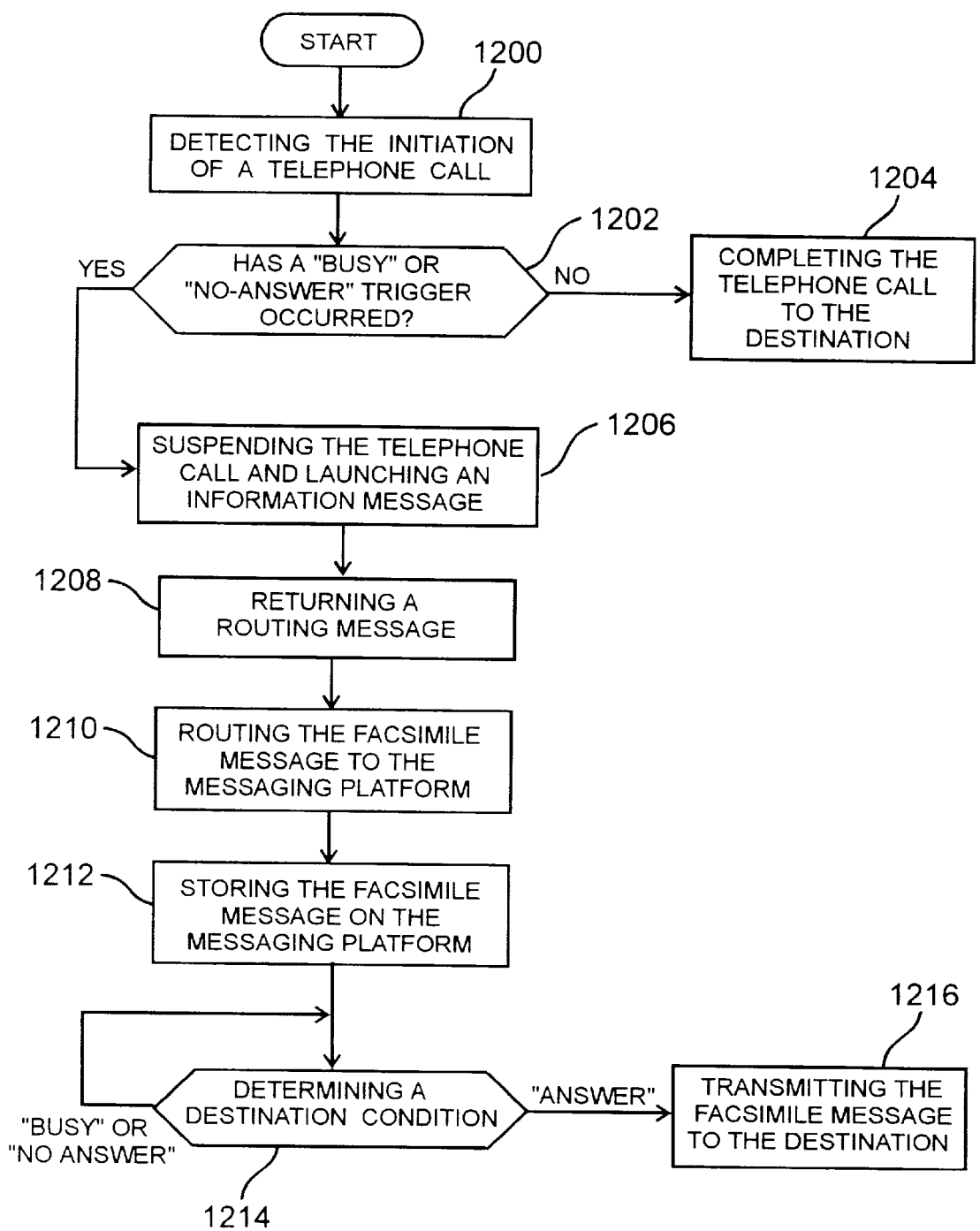
FIG. 18 presents a flowchart representation of a method in accordance with one embodiment of the present invention.

FIG. 18 presents a flowchart representation of a method in accordance with the present invention. In particular, a method is presented for transmitting a facsimile message from a line of an originating party to a destination using an advanced intelligent telecommunications network having a plurality of service switching points including an originating service switching point, at least one service control point, and a messaging platform capable of storing a plurality of facsimile messages.

The method begins in step 1200 by detecting an initiation of a telephone call from the originating party on the telecommunications network to the destination, with the content of the telephone call including the facsimile message. In step 1202, the originating service switching point determines a destination condition for the destination—the time of this determination being designated as the "first time".

If the destination condition was determined to be "answer", indicated by no trigger being detected, the method proceeds to step 1204, where the telephone call is completed to the destination. However, if the destination condition was "busy" or "no_answer" as indicated by the originating service switching point encountering a trigger, where the trigger may be a "busy" trigger or a "no_answer" trigger, the method continues to step 1206 where the originating service switching point suspends the telephone call and launches an information message to the at least one service control point. In a further embodiment of the present invention, Step 1202 determines whether a busy trigger or no_answer trigger occurs by detecting one of two conditions. The first condition occurs if the called switch returns a busy indication, indicating that the destination telephone is currently in use. The second condition is if the called switch timer expires, indicating that there was no answer at the destination telephone. The occurrence of the first condition causes the busy trigger to fire. The occurrence of the second condition causes the no_answer trigger to fire.

The method then proceeds to step 1208, where a routing message is returned from the at least one service control point to the originating service switching point to route the telephone call to the messaging platform. The method then continues in step 1210, where the facsimile message is routed to the messaging platform. If the facsimile message was routed to the messaging platform, the facsimile message is stored on the messaging platform as shown in step 1212. In step 1214 a destination condition is determined at a second time, where the second time is later than the first time. If the destination condition at the second time is "answer", the facsimile message is transmitted to the destination as shown in step 1216. If the destination condition was "busy" or "no_answer" the method returns to step 1214 (optionally after some delay) to determine the destination condition again.

It is worthwhile to note that in the embodiment shown in FIG. 18, the originating service switching point is able to complete the telephone call to the destination itself, without any communication with the at least one service control point, if no trigger is encountered at the first time. The originating service switching point communicates with the at least one service control point by launching an information message to the at least one service control point only if a "busy" or "no_answer" trigger was encountered at the first time. This allows a more efficient operation of the telecommunications system by freeing-up the at least one service control point to perform other tasks in situations where no trigger was encountered at the first time.

In the embodiment shown in FIG. 18, it is implied that the "busy" and "no_answer" triggers described are "originating busy" and "originating no_answer" triggers. In an alternate embodiment, the method could be implemented using "terminating busy" and "terminating no_answer" triggers. In this embodiment, a destination service switching point, rather than the originating office (which need not be a service switching point), would detect a "busy" or "no_answer" condition, thus encountering the respective busy or no_answer trigger. Upon encountering the busy or no_answer trigger, call processing is suspended, and an information message containing a "terminating busy" or "terminating no_answer" querry is sent to the service control point as shown in step 1206. Steps 1208 thru 1216 would then occur as stated above.

Figure 19:
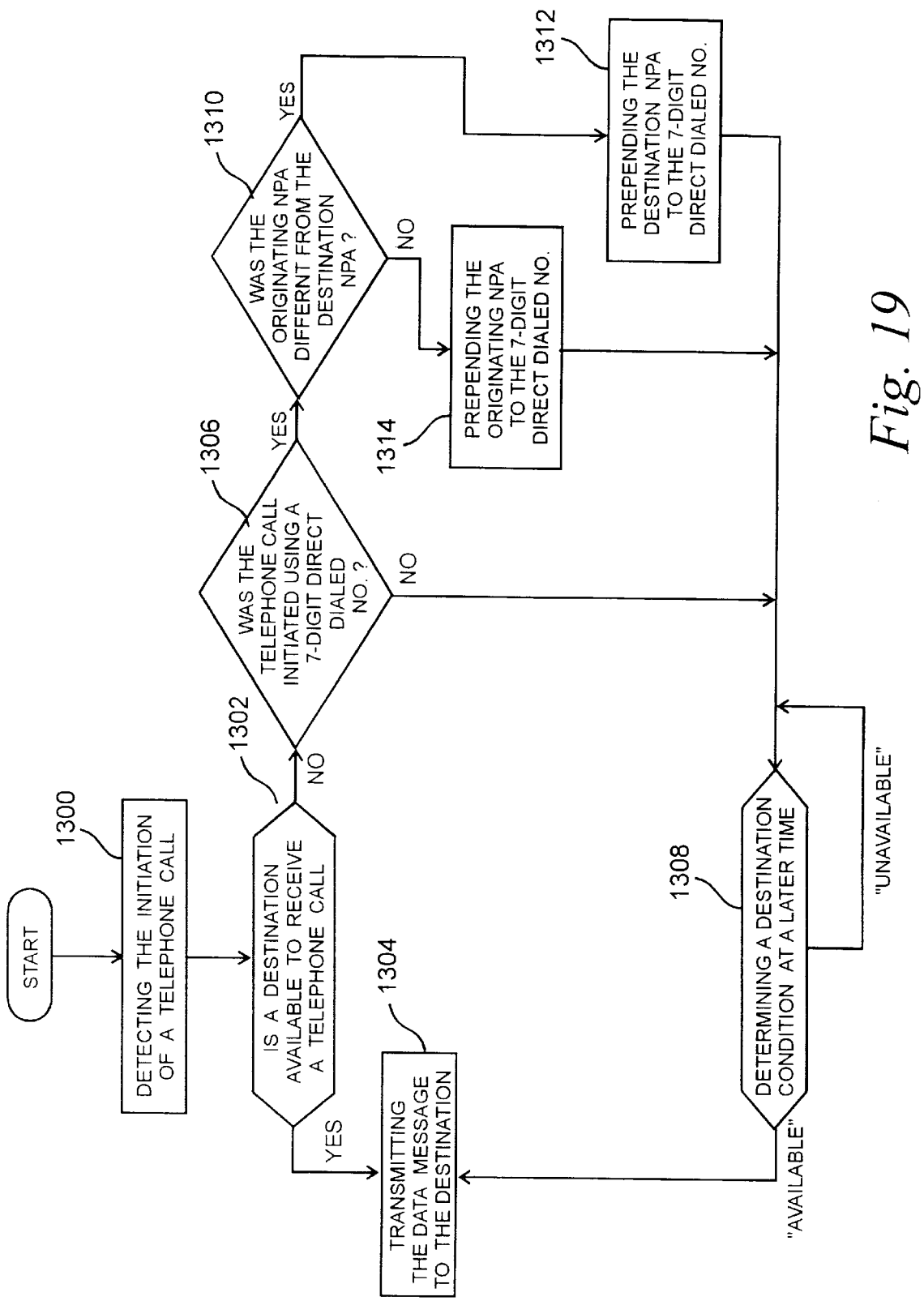
FIG. 19 presents a flowchart representation of a method in accordance with one embodiment of the present invention.

FIG. 19 presents a flowchart representation of a method in accordance with one embodiment of the present invention. This flowchart illustrates a method of transmitting a data message using a public-switched telecommunications network, the public-switched telecommunications network having a messaging platform capable of storing a plurality of facsimile messages. The method starts in step 1300 by detecting the initiation of a telephone call from an originating party on the telecommunications network to a destination, where the content of the telephone call includes the data message. Step 1302 continues by determining if the destination is able to receive the telephone call—the time of this determination being designated as the "first time".

If the destination is available at the first time, then the method proceeds to step 1304 by transmitting the data message to the destination. If, however, the destination is unavailable at the first time, the method proceeds as shown to step 1306 by determining if the telephone call was initiated using a seven digit direct dialed telephone number.

If the telephone call was not initiated using a seven digit direct dialed telephone number, the method proceeds to step 1308, where the destination condition is determined- the time of this determination to be known as the "later time". If the destination condition is available at the later time, then the method proceeds to step 1304 and transmits the data message to the destination. If, however, the destination is unavailable at the later time, the method proceeds back to step 1308 and continues to try again to find the destination available.

Steps 1310–1314 are identical to steps 910–914 described in FIG. 14.

This method is usable in conjunction with the systems described herein to transmit and store voice messages. If a voice message was transmitted and stored on the messaging platform, it is held for retrieval by an authorized person at the destination in a manner similar to standard voice mail systems.

In various embodiments of the present invention employing busy triggers and no answer triggers (discussed Infra in discussion for FIG. 20), steps 1306, and 1310–1314 are not needed. In this embodiment, the method continues from step 1302 directly to step 1308 without determining whether the telephone call was initiated using a seven digit direct dialed telephone number.

Figure 20:
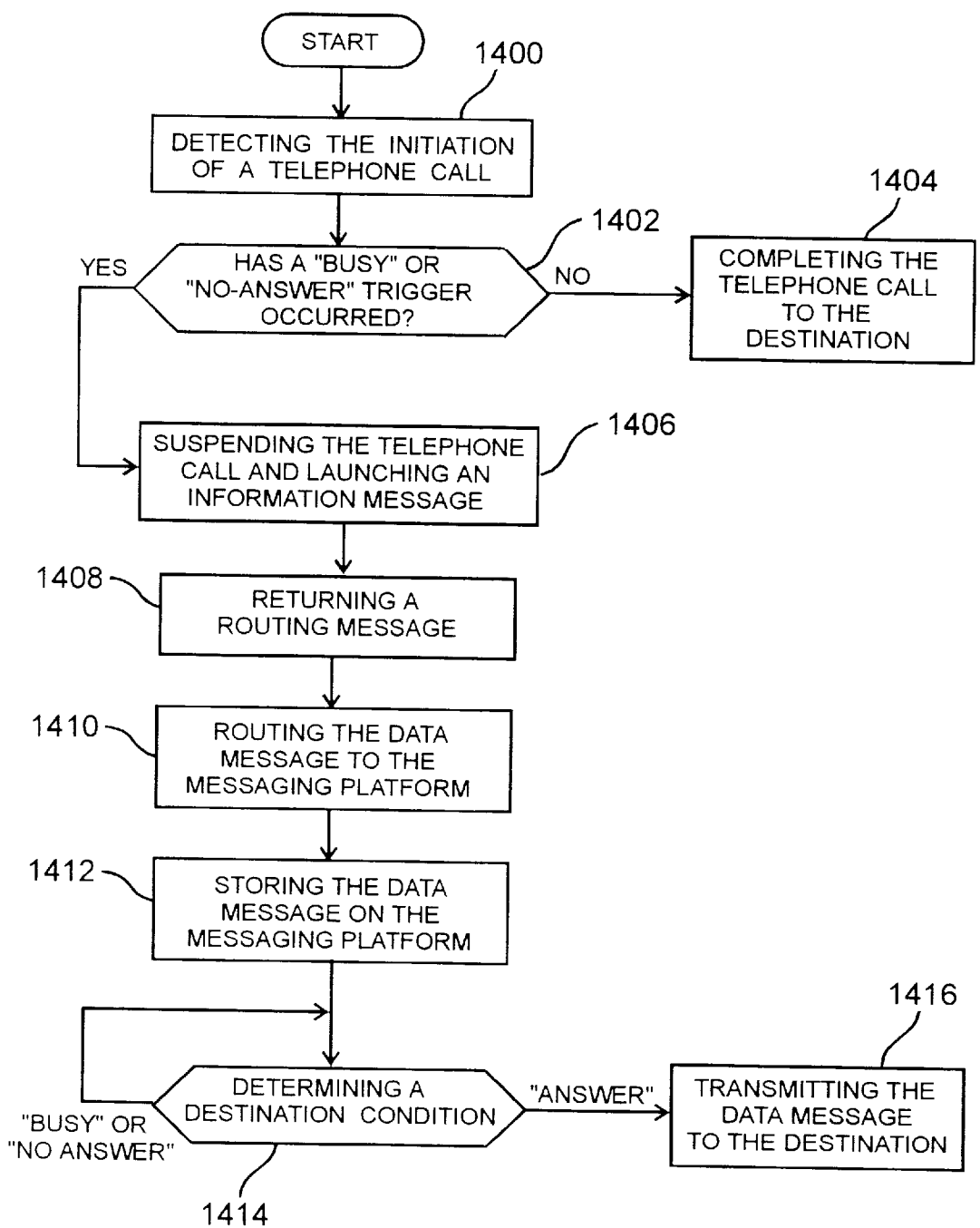
FIG. 20 presents a flowchart representation of a method in accordance with one embodiment of the present invention.

FIG. 20 presents a flowchart representation of a method in accordance with one embodiment of the present invention. In particular, a method is presented for transmitting a data message from a line of an originating party to a destination using an advanced intelligent telecommunications network having a plurality of service switching points including an originating service switching point, at least one service control point, and a messaging platform capable of storing a plurality of data messages.

The method begins in step 1400 by detecting an initiation of a telephone call on the telecommunications network from an originating party to a destination, with the content of the telephone call including the data message. Steps 1402–1408 are performed identically to steps 1202–1208 shown in FIG. 18.

In step 1410, the data message is routed to the messaging platform. If the data message was routed to the messaging platform, the data message is stored on the messaging platform as shown in step 1412. In step 1414 a destination condition is determined at a second time, where the second time is later than the first time. If the destination condition at the second time is "answer", the data message is transmitted to the destination as shown in step 1416. If the destination condition was "busy" or "no_answer" the method returns to step 1414 (optionally after some delay) to determine the destination condition again.

This method is usable in conjunction with the systems described herein to transmit and store voice messages. If a voice message was transmitted and stored on the messaging platform, it is held for retrieval by an authorized person at the destination in a manner similar to standard voice mail systems.

Figure 21:
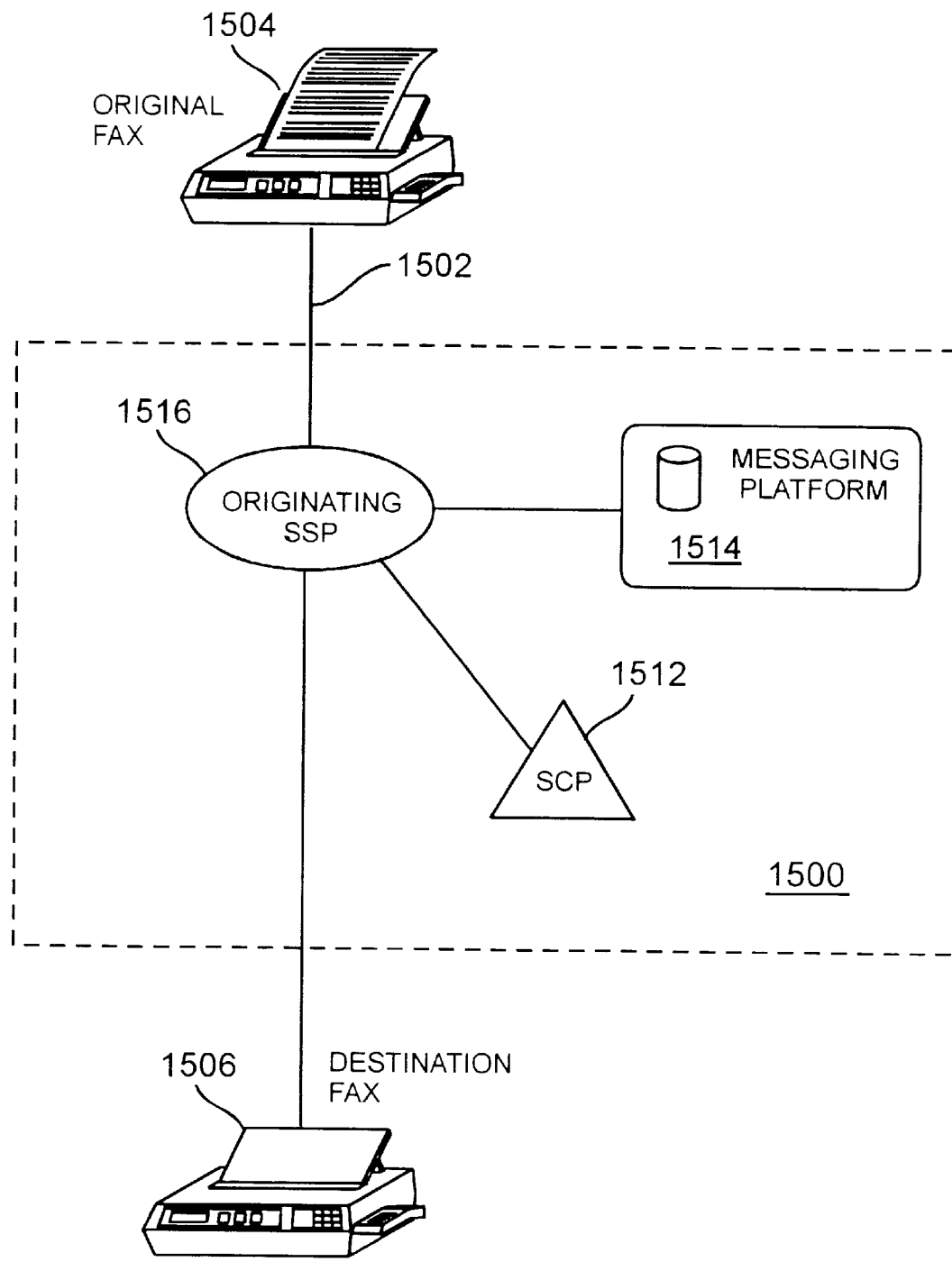
FIG. 21 presents a block diagram representation of a telecommunications system in accordance with one embodiment of the present invention.
Figure 22:
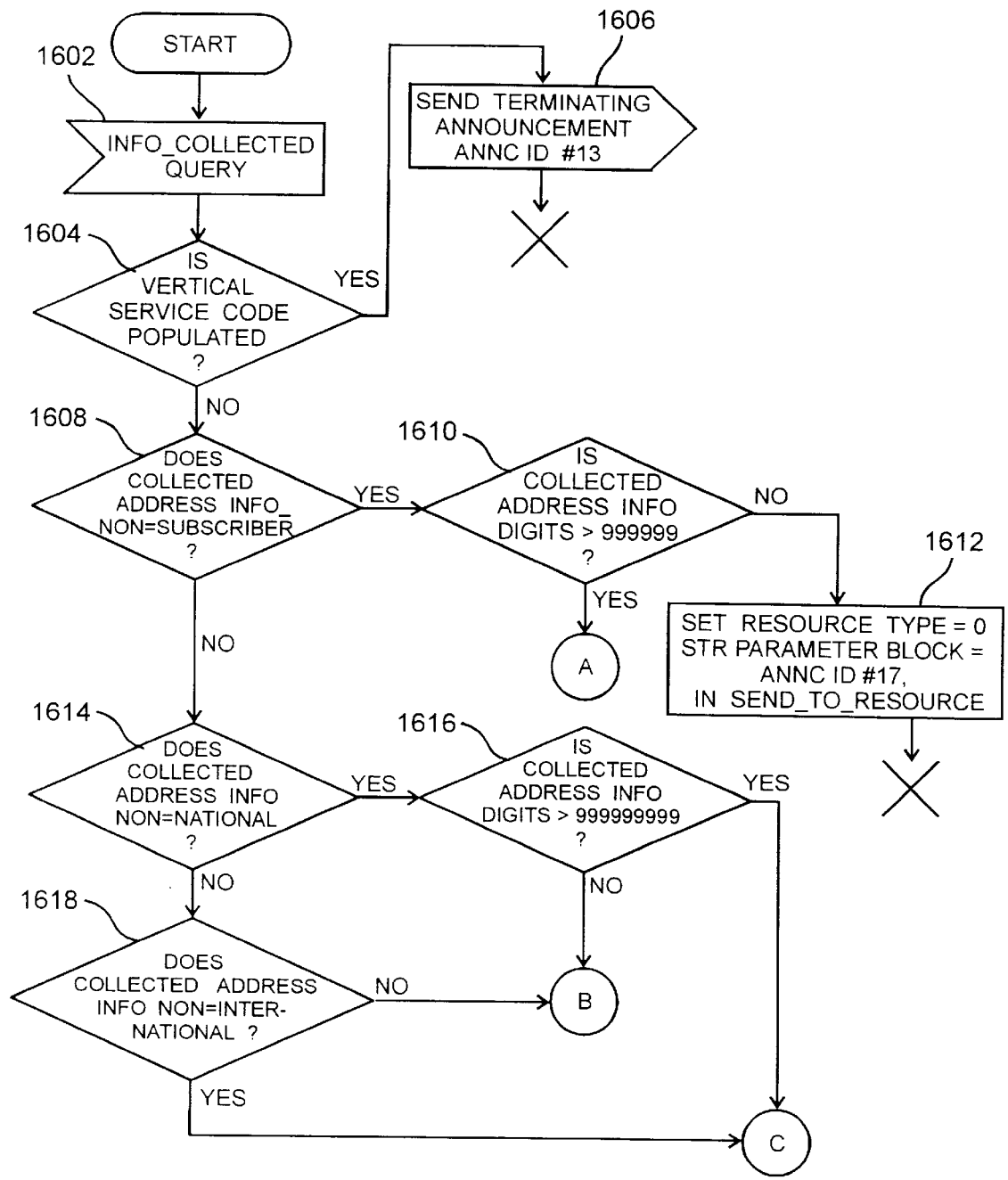
FIGS. 22–26 present flowchart representations in accordance with one embodiment of the present invention.
Figure 23:
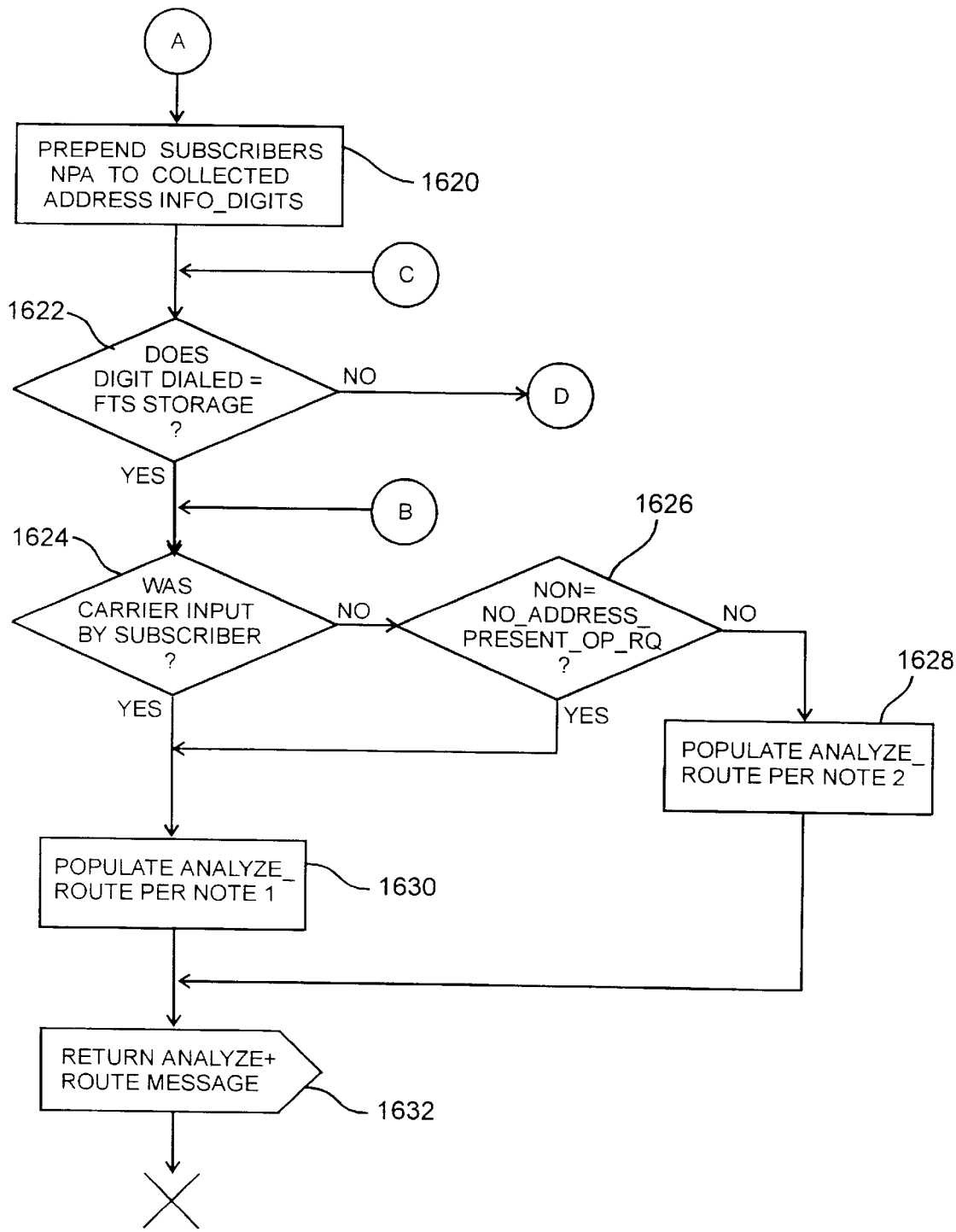
Figure 24:
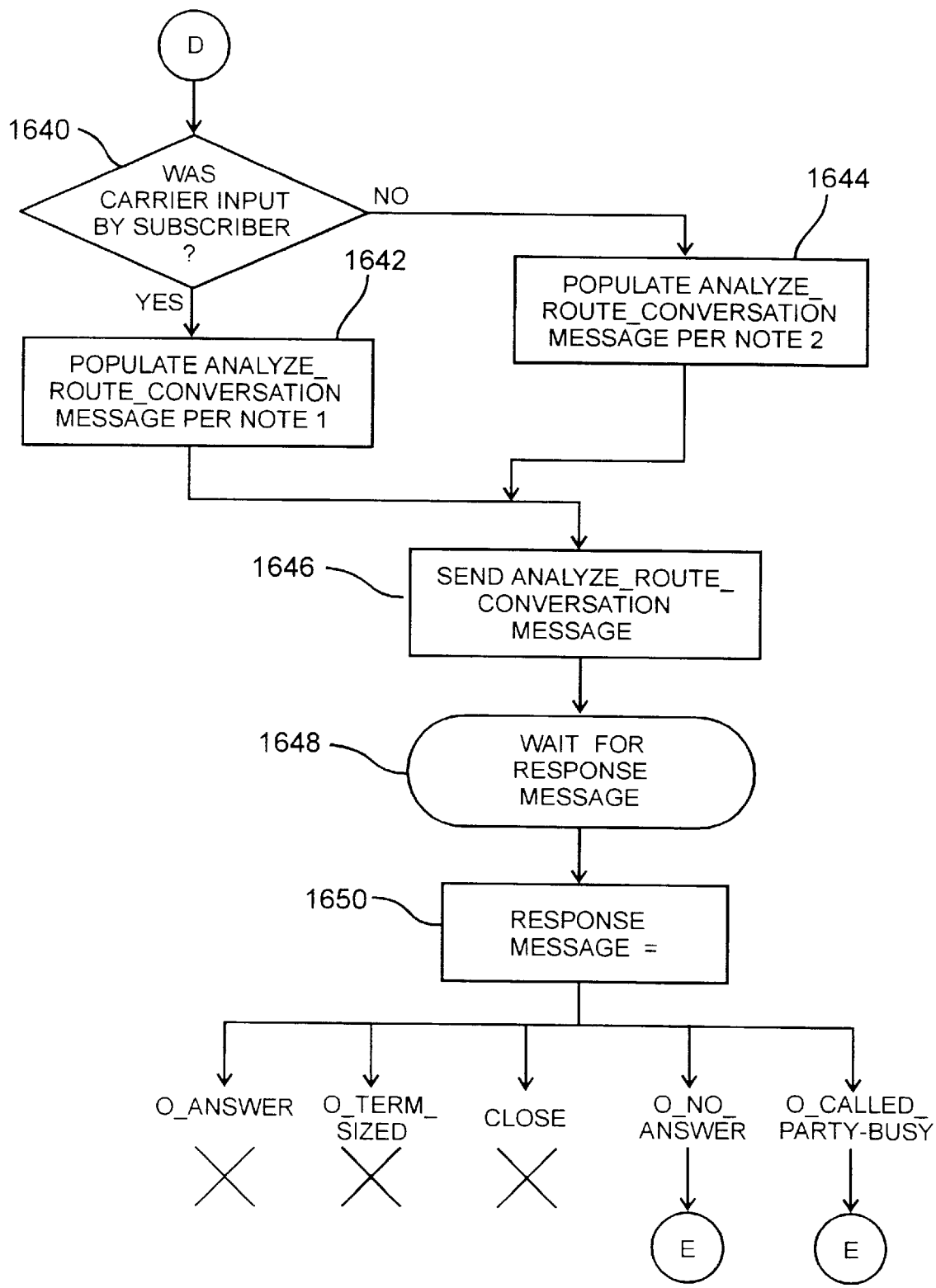

FIG. 21 presents a block diagram representation of a telecommunications system in accordance with one embodiment of the present invention. In this embodiment the various methods described herein can also be implemented. In particular, a telecommunication system 1500 is included for transmitting a facsimile message from a line 1502 of an originating party, corresponding to an originating fax machine 1504, to a destination having a destination fax machine 1506 using an advanced intelligent telecommunication network such as the SS7 network. In a preferred embodiment the 0.2 AIN system features are used in the implementation of the system described herein. The system includes an originating service switching point 1516 for detecting an initiation of a telephone call on the telecommunications network from an originating party to the original destination, the content of the telephone call including the facsimile message, and for determining a destination condition for a final destination—the time of this determination to be known as the "first time". The final destination is the original destination if the telephone call was not redirected at least once, and the final destination is a final redirected destination if the telephone call was redirected at least one time. Here, the "final redirected destination" is referring to the final destination that a telephone call to the original destination has been forwarded. The originating service switching point 1516 launches an information message if the destination condition was busy or no_answer at the first time, where "busy" indicates the destination is currently on a call, and "no-answer" indicates the destination does not pick-up the telephone call.

Service control point 1512, in communication with the original service switching point 1516, receives the information message from the originating service switching point 1516. The service control point 1512 then determines whether the telephone call was redirected by a redirecting party at least one time. If the telephone call was redirected at least one time, the service control point 1512 will determine the redirected destination, and modify the identification of the originating party as described in steps 712, 714 and 716 of FIG. 12. The service control point 1512 will then return a routing message to the originating service switching point 1516 to route the telephone call if the destination condition was "busy" or "no_answer" at the first time. If the telephone call was not redirected, the service control point 1512 will return a routing message to route the telephone call if the destination condition was "busy" or "no_answer" at the first time. In this latter case, the service control point 1512 will not determine a redirected destination, and will not modify the identification of the originating party before returning a routing message to the originating service switching point 1516.

If the service control point 1512 returned a routing message to the originating service switching point 1516, a messaging platform 1514, capable of storing a plurality of facsimile messages, receives and stores the routed facsimile message. If the facsimile message was routed to the messaging platform 1514, the messaging platform attempts to complete the call at a later time—designated as the "second time" and the messaging platform transmits the facsimile message to the destination if the destination condition was "answer" at the second time. Here, the condition "answer" indicates that the final destination picks-up the telephone call.

In an alternative embodiment employing busy triggers and no_answer triggers, it is not necessary for the service control point 1512 to determine whether a telephone call is redirected. In this alternative embodiment, the service control point 1512 will receive the information message from the originating service switching point 1516, and return a routing message to the originating service switching point 1516 without determining whether the telephone call was redirected, and without modifying the identification of the originating party.

In one embodiment of the present invention, an originating service switching point 1516 detects an initiation of a telephone call on the telecommunications network from an originating party to the destination, the content of the telephone call including the facsimile message, and determines a destination condition for the destination—the time of this determination to be known as the "first time". The originating service switching point launches an information message if the destination condition was busy or no_answer at the first time.

Service control point 1512, in communication with the originating service switching point 1516, receives the information message from the originating service switching point 1516. Service control point 1512 then determines whether the telephone call was initiated using a seven digit direct dialed telephone number, and if so, determines whether the originating NPA is different from the destination NPA. Service control point 1512 prepends the destination NPA to the seven digit direct dialed telephone number if the originating NPA is different from the destination NPA, and prepends the originating NPA to the seven digit direct dialed telephone number if the originating NPA is the same as the destination NPA. Service control point 1512 will then return a routing message to the originating service switching point 1516 to route the telephone call if the destination condition was "busy" or "no_answer" at the first time. If the telephone call was not initiated using a seven digit direct dialed telephone number, service control point 1512 will return a routing message to route the telephone call if the destination condition was "busy" or "no_answer" at the first time. In this latter case, service control point 1512 will not determine whether the telephone call was initiated using a seven digit direct dialed telephone number, and will not prepend any NPA to the destination telephone number before returning a routing message to the originating service switching point 1516.

If the service control point 1512 returned a routing message to the originating service switching point 1516, a messaging platform 1514, capable of storing a plurality of facsimile messages, receives and stores the routed facsimile message. The messaging platform then performs as described above. In various embodiments of the present invention employing busy triggers and no answer triggers, whether the telephone call was initiated using a seven digit direct dialed telephone call need not be determined by service control point 1512. In this embodiment, after the service control point 1512 receives an information message from the originating service switching point 1516, the service control point 1512 launches a routing message to the originating service switching point 1516 to route the telephone call without first determining whether the telephone call was initiated using a seven digit direct dialed telephone number.

In one embodiment of the present invention, originating service switching point 1516 detects an initiation of a telephone call on the telecommunications network from an originating party to a destination, the content of the telephone call including the facsimile message, and determines a destination condition for the destination at a first time. An information message is launched if a trigger is encountered at the first time, where the trigger may be a "busy" trigger or a "no_answer" trigger, and the telephone call is completed from the originating service switching point 1516 to the destination if the destination condition was "answer" at the first time;

Service control point 1512, in communication with originating service switching point 1516, receives the information messages from originating service switching point 1516, and returns a routing message from service control point 1512 to originating service switching point 1516 to route the telephone call if a trigger is encountered at the first time, where the trigger may be a "busy" trigger or a "no_answer" trigger.

If the service control point 1512 returned a routing message to the originating service switching point 1516, a messaging platform 1514, capable of storing a plurality of facsimile messages, receives and stores the routed facsimile message. The messaging platform then performs as described above.

In one embodiment of the present invention a plurality of messaging platforms are provided, the service control point determines the telephone number corresponding to the message platform using a lookup-table that is indexed by a telephone number corresponding to the calling party. The calling party number is passed to the service control point 1512 from the originating service control point 1516 via the information message. The service control point 1512 looks up the calling party number in a database to find a corresponding number for the messaging platform 1514 that serves that particular calling party. The service control point 1512 then effectuates the routing of the facsimile message to the messaging platform 1514 by sending a routing message to originating service switching point 1516 that includes the telephone number of the messaging platform 1514. The called party field for the call in the SS7 protocol is changed from the destination telephone number to the number for the messaging platform 1514. More particularly, the original called party number is assigned to the redirecting party ID field.

In one embodiment of the present invention the system described above is implemented as follows. The information message sent by the originating service switching point 1516 to the service control point 1512 includes an Information Collected Query as allowed in the 0.2 AIN protocol. In this embodiment, the service control point 1512 determines the destination condition by using an Analyze Route Message (including a Next Invent List). Once a response is received by the service control point 1512, the service control point 1512 returns the Analyze Route Message to the originating service switching point 1516. If the destination condition was "busy" or "no answer" then the Analyze Route Message includes the telephone number of the messaging platform 1514.

In one embodiment of the present invention, a destination service switching point (not shown) may be used. In this embodiment, the originating service switching point would detect an initiation of a telephone call on the telecommunications network to the destination by detecting an off-hook delay trigger assigned to the line 1502 of the originating party, and would suspend the telephone call and launch an information message if the off-hook delay trigger is detected. The destination service switching point would correspond to the destination fax machine 1506.

Service control point 1512 receives the information message from the originating service switching point 1516, and in response, determines a destination condition for the destination. In one embodiment of the present invention, the service control point 1512 launches a query to the destination service switching point to determine the destination condition. The destination service switching point responds to the service control point 1512 with a reply of either "busy" indicating the destination is currently on a call, "no-answer" indicating the destination does not pick-up the call or "answer" indicating that the destination picks-up the call and answers.

If the destination condition was "answer" at the first time, the service control point 1512 launches a transmit message to the originating service switching point to transmit the facsimile message to the destination. If, and only if the destination condition was "busy" or "no-answer" at the first time, the service control point 1512 launches a routing message from the at least one service control point to the originating service switching point to route the telephone call. In this case, a messaging platform 1514, capable of storing a plurality of facsimile messages, receives and stores the routed facsimile message. The messaging platform 1514 then operates as described above.

In one embodiment of the present invention, signal transfer points (not shown) may be used. In this embodiment, the originating service switching point 1516, the destination service switching point (if present), the service control point 1512, and the messaging platform 1514 may perform as stated in the above embodiments.

The signal transfer point would transfer messages back and forth between the originating service switching point 1516 and the service control point 1512, between the originating service switching point 1516 and the destination service switching point (if present), and between the originating service switching point 1516 and the messaging platform 1514.

It is worthwhile to note that in one embodiment, the originating service switching point 1516 may route the facsimile message to the messaging platform 1514 directly, or by means of the telephone network (not shown).

FIGS. 22–26 present flowchart representations in accordance with a further embodiment of the present invention. In particular, these flowcharts represent specific procedures to be performed by a service control point in response to an Information Collected Query from an originating service switching point. In step 1602, an Information_Collected query is received by the service control point. If the called party number has a star code prefix this indicates a vertical service code, where vertical service code is described above in reference to FIGS. 6–9. If a vertical service code is detected in step 1604, then the service control point returns an announcement number to the originating service switching point to play a message to the user as shown in step 1606, such as a fast busy signal, indicating that the caller has entered an incorrect sequence for this service and control of the call is returned to the service switching point. If no vertical service code is detected, the method proceeds to step 1608.

In step 1608, the service control point checks the called party number to determine if the called party is a subscriber to the service. If the called party number corresponds to a service subscriber the service control point then checks to see if the called party number has at least 7 digits. This is performed by determining if the called party number is greater than 999999 as shown in step 1610. If the called party number is not greater than 999999, then the service control point returns an announcement, as shown in step 1612, and control of the call to the originating service switching point. In response, the service switching point plays a message to the user that indicates that the particular call cannot be completed as dialed. If the called party number is greater than 999999, the method proceeds to step 1620.

If the called party number does not correspond to a subscriber number, the method proceeds to step 1614 where the service control point determines if the called party number starts with a one and includes a valid area code. If so, the called party number is checked to see if it conforms to the national numbering plan (the form area code+seven digit number, which may optionally be preceded by a "1"). This step is performed as shown in step 1616 by determining if the called party number is greater than 999999999. If so, the method proceeds to step 1622. If not, the method proceeds to step 1624.

If the prefix of the called party number does not correspond to a national number (a valid area code, which may optionally be preceded by a "1") in step 1614, the method proceeds to step 1618 where the service control point determines if a valid international number is present. If so, the method proceeds to step 1622; if not, the method proceeds to step 1624.

In step 1620, the area code (NPA) is prepended to the called party number. In step 1622, the service control point determines if the called party number corresponds to the messaging platform number—indicating that the user has attempted to send a message to the messaging platform directly. If this is the case, the method proceeds to step 1624 to begin to handle the call without the application of the service. If the called party number does not correspond to the messaging platform, the method proceeds to step 1640.

In step 1624, the service control point determines if a particular interexchange carrier has been designated by the calling party. If so, the method proceeds to step 1630 and an analyze route message is populated as shown in note 1 of Table 1. If not, the service control point determines if an operator has been requested as shown in step 1626. If no operator has been requested then the method proceeds to step 1628 to populate the analyze route message as shown in note 2 in Table 1. If, however, an operator has been requested, then the method proceeds to step 1630. In any case, as shown in step 1632, this analyze route message is transmitted to the originating service switching point where control of the call is returned.

In step 1640, the service control point determines if a particular interexchange carrier has been designated by the calling party. If so, the method proceeds to step 1642 and an analyze route message is populated as shown in note 1 of Table 1. If not, the method proceeds to step 1644 to populate the analyze route message as shown in note 2 in Table 1. In either case, an analyze route conversation message is sent to the service switching point in an attempt to complete the call as shown in step 1646. The service control point then waits for a response as shown in step 1648. If the response from the service switching point is either "answer" indicating that the call has been answered, or "originating termination" indicating that the calling party has hung-up, or "close" indicating that the service switching point is no longer processing the call, then the control of the call is returned to the service switching point.

If the response from the service switching point is either "busy" or "no answer", the method proceeds to step 1660. In step 1660, the service control point determines whether the telephone call was forwarded (redirected) by checking whether RedirectionInformation is present in the Info__Collected RedirectionInformation Parameter. If RedirectionInformation is not present, the method proceeds to step 1670. If RedirectionInformatin is present, indicating that the telephone call was redirected, the method continues to step 1662.

In Step 1662, the service control point determines whether the telephone call was redirected more than one time by determining whether the RedirectingPartyID parameter is present. If the RedirectionPartyId parameter is present, indicating that the telephone call was redirected more than one time, the method continues to step 1664 where the CallingPartyId parameter is populated with the contents of the RedirectionPartyId parameter. The method then continues to step 1670. If the RedirectionPartyId parameter is not present, indicating that the telephone call was not redirected more than one time, the method proceeds to step 1666. In step 1666, the service control point determines whether the OriginalCalledPartyId parameter is present. If the OriginalCalledPartyId parameter is not present, the method proceeds to step 1624 and continues as previously described. If the OriginalCalledPartyId parameter is present, the method continues to step 1668 where the CallingPartyId parameter is populated with the contents of the OriginalCalledPartyId parameter. The method then continues to step 1670.

In step 1670, the service control point determines if the calling party number corresponds to an inter-NPA seven digit dialing case. If the calling party is not a subscriber number, or if the calling party number is ten digits, the method proceeds directly to step 1672. If the calling party is a seven digit number, the method proceeds to step 1674 where the messaging platform area code (NPA) is substituted for the calling party area code. In step 1676, the called party number is stored in two fields; the area code and exchange in one field, field 2, and the last four digits of the called party number in another field, field 3. In step 1678, the service control point determines if the area code and exchange stored in field 2 are present in a list of area code and exchange combinations which cannot occur per industry standard. If so, the method prepends field 3 with an area code and exchange determined from a lookup table and continues to step 1672. If not, the method proceeds directly to step 1672. If the area code and exchange match the area code and exchange of the messaging platform, the method first proceeds to step 1680 where the original four digits of the called party number are prepended with an area code and exchange that are determined from a look up table. In step 1672, the analyze route message is populated as shown in note 3 of Table 1 and control of the call is returned to the originating service switching point. This routes the call to the messaging platform for storage if the calling party is a subscriber to the service.

The parameters of the analyze route message sent from the service control point to the originating service switching point and the analyze route conversation message sent from the service control point to the destination service switching point, as described above, are shown in Table 1. The ChargeNumber corresponds to the Automatic Number Identification (ANI) of the calling party. The CallingPartyID contains the Directory Number (DN) of the calling party. The ChargePartyStationType contains the calling station type. The ChargeNumber, the CallingPartyID and the ChargePartyStationType are all populated with information supplied by the originating service switching point to the service control point via an Info__Collected message. The CalledParty__Digits are populated by the DN of the called party in cases covered by notes 1 & 2 and by a number stored at a specific index number of an RC__Data__Tbl located at the service control point in cases covered by note 3. The Traveling Class Mark (TCM) is a class of service indicator used with SS7 trunking. The RedirectingPartyID contains the DN of the called party. The PrimaryCarrier corresponds to an identification code that identifies the primary carrier for the subscriber. The AMAsipID is a billing parameter used to bill a leg of the call.

Figure 27:
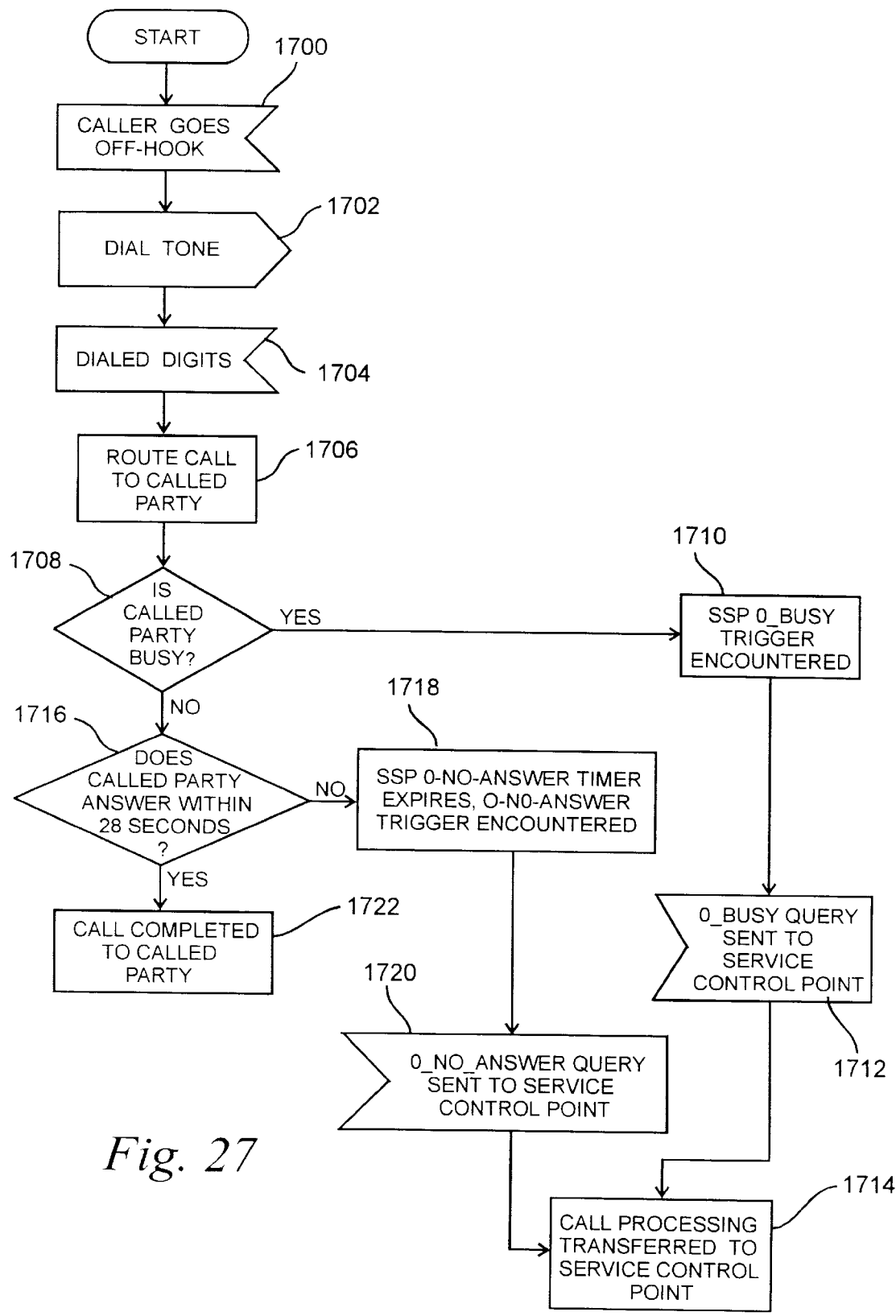
FIG. 27 presents a flowchart representation of a method in accordance with one embodiment of the present invention.

FIG. 27 presents a flowchart representation of a method in accordance with one embodiment of the present invention. In particular, this flowchart represents the specific procedures to be performed by a service switching point in a telecommunications system using busy triggers and no__answer triggers. In step 1700, the service switching point detects the caller going off-hook. A dial tone is provided on the line of the caller, as shown in step 1702, and the method continues to step 1704, where the service switching point waits for the dialed digits to be entered by the calling party. After the dialed digits have been entered by the calling party, the service switching point attempts to route the call to the called party, as shown in step 1706.

In step 1708, the service switching point determines if the called party is busy. If so, the method continues to step 1710, where the SSP O__Busy trigger is encountered. An O__Busy Querry is then sent to the service control point, as shown in 1712, and the method proceeds to step 1714, where call processing is transferred to the service control point.

If the called party was not determined to be busy in step 1708, the method continues to step 1716, where the service control point determines whether the called party answers within twenty eight seconds. If the called party does not answer the call within twenty eight seconds, the method continues to step 1718, where the ssp O__NO__Answer timer expires, and an O__No__Answer trigger is encountered by the service switching point. The method proceeds to step 1720 where an O__No__Answer query is sent to the service control point. Call processing is then transferred to the service control point as shown in step 1714.

In step 1716, if the called party does answer within twenty eight seconds, the method continues to step 1722 where the service switching point completes the telephone call to the called party.

Figure 25:
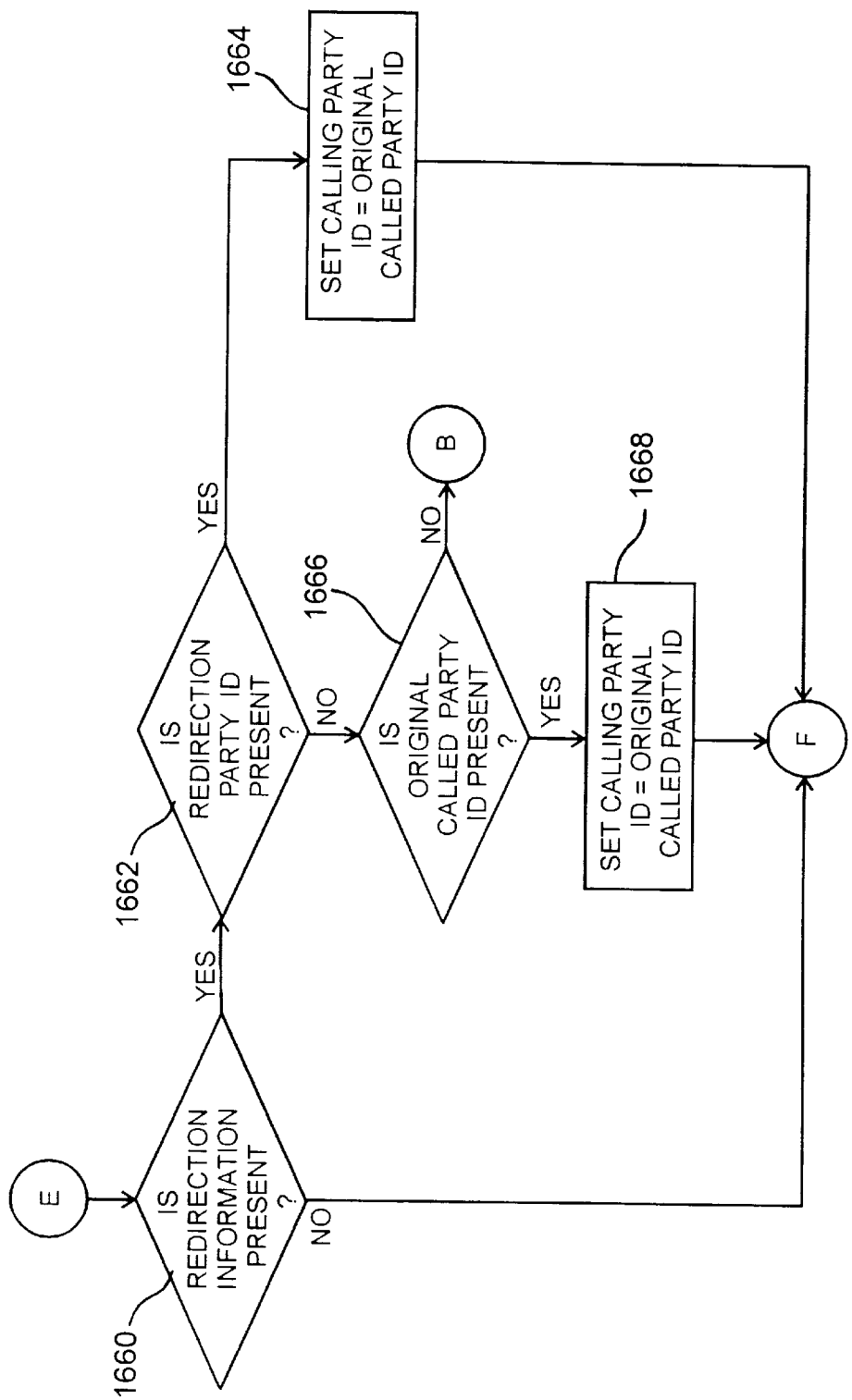
Figure 26:
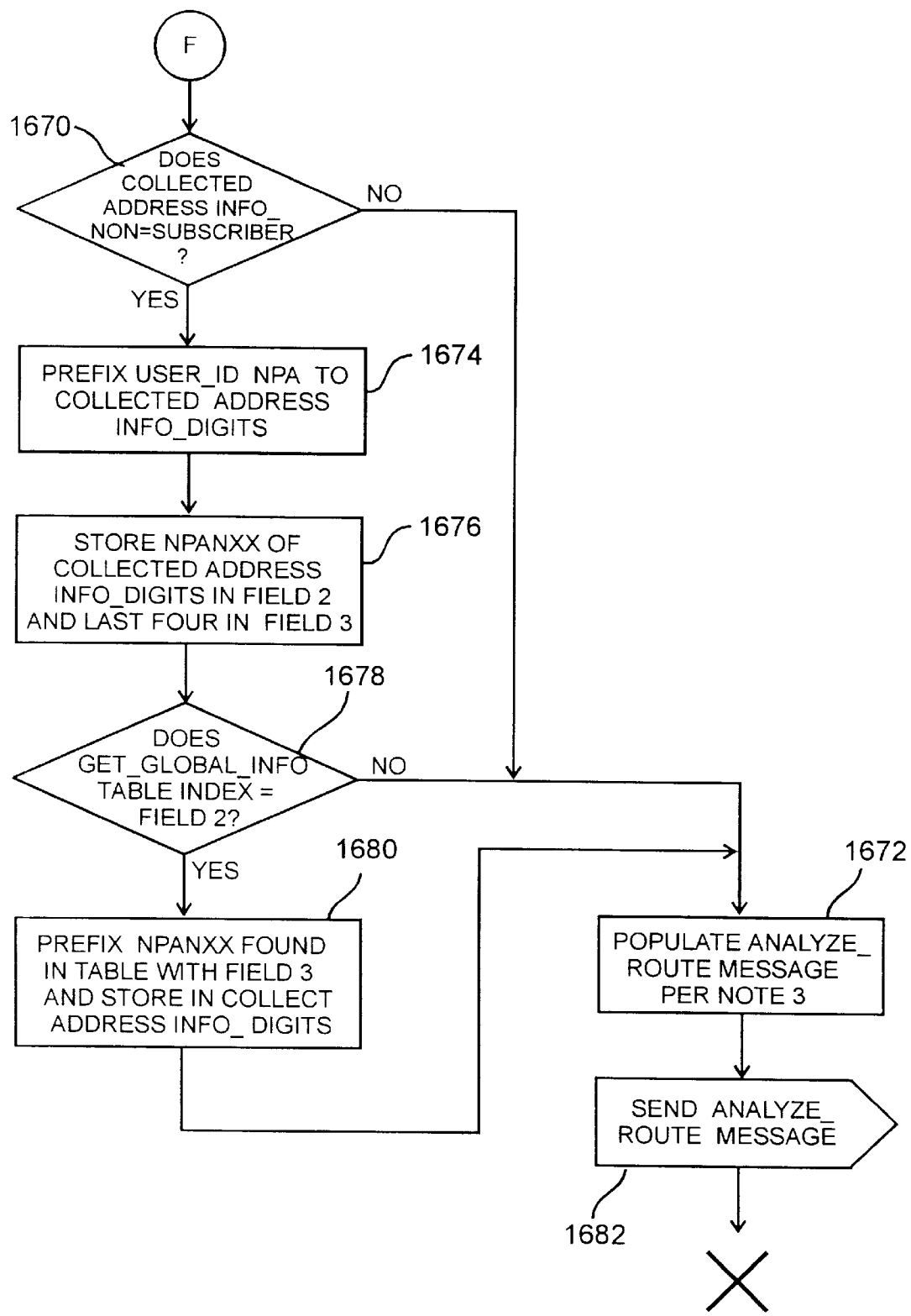

Once call processing is transferred to the service control point, the service control point could handle the telephone call as shown in step 1660 of FIG. 25.

The parameters of the O__Busy query and O__No__Answer query are the same, and are shown in Note 4 of Table 1. The ChargeNumber, CallingPartyID, ChargePartyStationType, and PrimaryCarrier parameters are the same as mentioned in the discussions of FIGS. 6–9 and FIGS. 22–26. CalledPartID contains the Directory Number of the called party. TriggerCriteriaType contains information about why the a trigger was encountered, and contains O_No_Answer and Busy_Cause parameters. The Busy_Cause provides the reason for the busy condition. O_No_Answer provides the reason for a no_answer condition.

In the embodiments of the present invention described above, the facsimile message may be stored and forwarded every time a telephone call is initiated by the originating party, or for all destinations that are in a busy or no_answer condition that originates from a calling party that subscribes to the particular service. In an alternative embodiment, each subscriber has an option of providing a list of priority numbers for which the service would apply. In this embodiment, the service could be invoked in busy or no_answer calls made to the destinations on this list, or in every time a telephone call is initiated by the originating party to destinations on this list. Other calls would be treated normally, without the invocation of this store and forward service.

It is worthwhile to note that, in the various embodiments of the present invention described above, the facsimile message may be stored on the messaging platform every time a call is initiated, or only if the destination is unavailable at the first time. The latter case means that other facsimile messages can be routed to the destination without storage and without using the messaging platform. This allows the messaging platform to have either lower memory requirements to handle normal call volume or, alternatively, allows greater call capacity for a fixed memory size.

In an alternative embodiment of the present invention, if the number of delivery attempts to the destination have been exhausted, rather than sending a facsimile message to the originating fax machine, an administrative facility, such as a service bureau, can be notified of the failure along with the content of the facsimile message. In this fashion, administrative personnel can try to manually send the facsimile message or can take other steps such as contacting the originator of the facsimile message.

In an additional embodiment of the present invention, the way that the failure to deliver a facsimile message is handled is dependent upon a failure condition. The messaging platform will continue to attempt to deliver a facsimile message to the destination if the destination is repeatedly busy or there is no answer. If, however, the platform recognizes that a fax tone is not returned upon answer (implying a voice answer) then delivery attempts may be canceled after a fewer number of retries so as not to annoy the receiver. The number of retries allowed in either failure condition may be a system administration parameter that is constant for all users. Alternatively, the number of retries allowed for each failure condition could be customized at subscriber request for each subscriber if desired.

The methods described above, if the facsimile message were stored, would generally require initiating a new telephone call to the destination. In a further embodiment of the present invention, if the destination was unavailable at the first time, the method proceeds to "camp-on" the destination to wait for the destination to become available. In this fashion, once an indication is received that the destination is available the transmission of the facsimile message to the destination can be initiated. In this embodiment, a timer could be set to time the period that the system has camped-on a particular destination. After a predetermined time period has been exceeded, this method would resort to routing an error message back to the originating fax machine to indicate the message could not be sent.

In the various embodiments described above, a stored facsimile message could also be erased from the messaging platform after the message is properly sent or after the messaging platform determines that the message cannot be sent. This allows the particular portions of memory on the messaging platform used to store the facsimile message to be reused to store additional messages.

It should also be noted that the various methods described above and the other embodiments of the present invention described herein—like a normal facsimile transmission—operate by having the user initiate a facsimile transmission to the telephone number corresponding to the destination. They enter the telephone number of destination on their fax machine. The fax machine operates as normal and the message is transmitted—either to the messaging platform or to the destination. In either case the fax machine itself is free for sending and receiving additional faxes. The user does not direct the facsimile message to the messaging platform. The facsimile message may be routed to the messaging platform every time a telephone call is initiated, or only if the destination is unavailable.

While portions of the description herein has referred to the transmission of facsimile messages, the methods and systems described are like-wise suited for applications in other areas of data transmission. In particular, other applications of the present invention include: credit verification transactions where a credit card is scanned at a point of sale and a credit card database is accessed; communications involved with the transfer of billing and/or sales data; market transaction data transfers; automated teller machine transactions; and communications involving the sale of lottery tickets.

While the various embodiments of the present invention have been described in conjunction with a public switched telephone network, these embodiments could similarly apply to communications of messages over other communication networks. In particular, facsimile messages and voice messages, within the scope of the present invention, may be transmitted using data communications networks such as the internet.

The various methods described herein, in a preferred embodiment, are intended for operation as software programs running on a computer processor. One of ordinary skill in the art will recognize that other hardware implementations such as application specific integrated circuits, programmable logic arrays and other hardware devices could likewise be constructed to implement the methods described herein. In should also be noted that the various methods of the present invention could be stored on a tangible storage medium such as a magnetic or optical disk, read-only memory or random access memory and be produced as an article of manufacture.

Thus, there has been described herein a concept, as well as several embodiments including a preferred embodiment, of a method and telecommunication system for transmitting a facsimile message. The various embodiments of methods and systems may store a facsimile message only if the destination is unavailable, or every time a telephone call is initiated. The various embodiments of methods and systems also describe how a facsimile message is handled where a telephone call is redirected at least one time, and where a telephone call is initiated using a seven digit direct dialed telephone number. Furthermore, the various embodiments of methods and systems describe how "busy" and "no_ answer" triggers may be used in conjunction with storing a facsimile message to allow a more efficient operating of a telecommunications system. As herein described, these various methods and systems provide a significant improvement over the prior art. Additionally, the various embodiments of the present invention herein-described have other features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall the true spirit and scope of the invention.

What is claimed is:

1. A method of transmitting a facsimile message using a public-switched telecommunications network, the public-switched telecommunications network having a messaging platform capable of storing a plurality of facsimile messages, the method comprising the steps of:
    (a) detecting an initiation of a telephone call from an originating party on the telecommunications network to an original destination, the content of the telephone call including the facsimile message;
    (b) determining if a final destination is able to receive the telephone call at a first time;
    (c) if the final destination was able to receive the telephone call at the first time, transmitting the facsimile message to the final destination;
    (d) if the final destination was not able to receive the telephone call at the first time, determining whether the telephone call was redirected at least one time by a redirecting party;
    (e) if the telephone call was determined to be not redirected at least one time, proceeding directly to step (g);
    (f) if the telephone call was determined to be redirected at least one time, determining a redirected destination, and modifying an identification of the originating party;
    (g) if the final destination was not able to receive the telephone call at the first time, storing the facsimile message in the messaging platform and determining if the final destination is able to receive the telephone call at a later time; and
    (h) if the final destination was able to receive the telephone call at the later time, transmitting the facsimile message to the final destination;
    wherein the final destination is the original destination if the telephone call was not redirected at least once, and wherein the final destination is the final redirected destination if the telephone call was redirected at least one time.

2. The method of claim 1 wherein the step of determining whether the telephone call was redirected includes searching a specified memory address for a predetermined data pattern.

3. The method of claim 2 wherein the specified memory address contains a RedirectionInformation parameter wherein:
    the presence of the predetermined data pattern in the RedirectionInformation parameter indicates that the telephone call was redirected; and
    the absence of the predetermined data pattern in the RedirectionInformation parameter indicates that the telephone call was not redirected.

4. The method of claim 1 wherein the step of modifying the identification of the originating party includes determining whether the telephone call was redirected more than one time.

5. The method of claim 4 further comprising the steps of:
    if the telephone call was redirected more than one time, changing the identification of the originating party to that of a final redirecting party; and
    if the telephone call was not redirected more than one time, changing the identification of the originating party to that of the original destination.

6. The method of claim 1 further comprising the step of storing the facsimile message on the messaging platform.

7. The method of claim 1 wherein the step of transmitting the facsimile message to the final destination includes the step of transmitting the facsimile message to the messaging platform only if the destination is unavailable at the first time.

8. The method of claim 7 further comprising the step of storing the facsimile message on the messaging platform.

9. The method of claim 8, wherein if the facsimile message was stored on the messaging platform,
    (i) determining that the final destination is available at the later time; and
    (ii) transmitting the facsimile message to the final destination if the final destination is available at the later time.

10. A system for transmitting a facsimile message using a public-switched telecommunications network, the public-switched telecommunications network having a messaging platform capable of storing a plurality of facsimile messages, the system comprising:
    a detector for detecting the initiation of a telephone call from an originating party on the telecommunications network to an original destination, the content of the telephone call including the facsimile message, and for determining if a final destination is able to receive the telephone call;
    means, coupled to the detector, for determining whether the telephone call was redirected by a redirecting party at least one time, and if so, determining a redirected destination, wherein the final destination is the original destination if the telephone call was not redirected at least once, and wherein the final destination is the redirected destination if the telephone call was redirected at least one time; and
    a messaging platform, in communication with the detector, for receiving and storing a routed facsimile message;
    wherein, the means for determining whether the telephone call was redirected routes the facsimile message to the messaging platform if the final destination was not able to receive the telephone call at a first time, and wherein the messaging platform includes means for transmitting the facsimile message to the final destination.

11. The system of claim 10 wherein the means for determining whether the telephone call was redirected includes means for searching a specified memory address for a predetermined data pattern.

12. The system of claim 11 wherein the specified memory address contains a RedirectionInformation parameter wherein:
    the presence of the predetermined data pattern in the RedirectionInformation parameter indicates that the telephone call was redirected; and
    the absence of the predetermined data pattern in the RedirectionInformation parameter indicates that the telephone call was not redirected.

13. The system of claim 10 wherein the means for modifying the identification of the originating party if the telephone call was redirected at least one time includes means for determining whether the telephone call was redirected more than one time.

14. The system of claim 13 further comprising means for changing the identification of the originating party to that of a final redirecting party if the telephone call was redirected more than one time, and means for changing the identification of the originating party to that of the original destination if the telephone call was not redirected more than one time.

15. The system of claim 10 wherein the means for transmitting the facsimile message to the final destination includes means for transmitting the facsimile message to the messaging platform.

16. The system of claim 10 wherein the means for transmitting the facsimile message to the final destination includes means for transmitting the facsimile message to the messaging platform only if the destination is unavailable at a first time.

17. The system of claim 16 further comprising means for storing the facsimile message on the messaging platform.

18. The system of claim 17, further comprising means, if the facsimile message was stored on the messaging platform, for the messaging platform
  (i) determining that the final destination is available at a second time, the second time later than the first time, and
  (ii) transmitting the facsimile message to the final destination if the final destination is available at the second time.

19. A method of transmitting a facsimile message from a line of an originating party to a destination using an advanced intelligent telecommunications network having a plurality of service switching points including an originating service switching point, at least one service control point, and a messaging platform capable of storing a plurality of facsimile messages, the method comprising the steps of:
  detecting an initiation of a telephone call on the telecommunications network from an originating party to an original destination, the content of the telephone call including the facsimile message;
  determining a destination condition for a final destination at a first time, wherein the final destination is the original destination if the call was not redirected at least once, and wherein the final destination is the final redirected destination if the call was redirected at least one time;
  suspending the telephone call and launching an information message from the originating service switching point to the at least one service control point if a busy or no_answer condition is detected;
  determining whether the telephone call was redirected by a redirecting party at least one time, and if so, determining a redirected destination;
  if the telephone call was redirected at least one time, modifying an identification of the originating party;
  returning a routing message from the at least one service control point to the originating service switching point to route the telephone call to the messaging platform if the destination condition was "busy" or "no_answer" at the first time; and
  if the facsimile message was routed to the messaging platform,
    (i) storing the routed facsimile message on the messaging platform;
    (ii) determining a destination condition for the final destination at a second time, the second time later than the first time; and
    (iii) transmitting the facsimile message to the final destination if the destination condition is "answer" at the second time.

20. The method of claim 19 wherein the step of determining whether the telephone call was redirected includes searching a specified memory address for a predetermined data pattern.

21. The method of claim 20 wherein the specified memory address contains a RedirectionInformation parameter wherein:
  the presence of the predetermined data pattern in the RedirectionInformation parameter indicates that the telephone call was redirected; and
  the absence of the predetermined data pattern in the RedirectionInformation parameter indicates that the telephone call was not redirected.

22. The method of claim 19 wherein the step of modifying the identification of the originating party if the telephone call was redirected at least one time includes determining whether the telephone call was redirected more than one time.

23. The method of claim 22 further comprising the steps of:
  if the telephone call was redirected more than one time, changing the identification of the originating party to that of a final redirecting party; and
  if the telephone call was not redirected more than one time, changing the identification of the originating party to that of the original destination.

24. The method of claim 19 wherein the routing message contains a telephone number corresponding to the message platform, to which the facsimile message is to be routed.

25. The method of claim 24 wherein the step of returning a routing message includes determining the telephone number corresponding to the message platform using a lookup-table that is indexed by a telephone number corresponding to the calling party.

26. The method of claim 19 further comprising the step of sending a close call message from a destination service switching point to the at least one service control point if the call is completed.

27. The method of claim 19 further comprising the step of sending a close call message from the originating service switching point to the at least one service control point if the telephone call is abandoned prior to receiving a routing message from the at least one service control point.

28. The method of claim 19 further comprising the step of determining that the destination is not a valid destination for receiving the facsimile message.

29. The method of claim 28 further comprising the step of aborting the telephone call if the destination is not a valid destination for receiving the facsimile message.

30. The method of claim 19 wherein the step of returning a routing message from the at least one service control point to the originating service switching point to route the telephone call to the messaging platform occurs only if a busy or no_answer condition is detected.

31. A telecommunications system for transmitting a facsimile message from a line of an originating party to a destination using an advanced intelligent telecommunications network, the system comprising:
  an originating service switching point for detecting an initiation of a telephone call on the telecommunications network from the originating party to an original destination, the content of the telephone call including the facsimile message, for determining a destination condition for a final destination at a first time, wherein the final destination is the original destination if the telephone call was not redirected at least once, and wherein the final destination is a final redirected destination if the telephone call was redirected at least one time, and for launching an information message if the destination condition was "busy" or "no_answer" at the first time;

a service control point, in communication with the originating service switching point, for receiving the information messages from the originating service switching point, for determining whether the telephone call was redirected by a redirecting party at least one time, and if so, determining a redirected destination, for modifying an identification of the originating party if the telephone call was redirected at least one time, and for returning a routing message from the at least one service control point to the originating service switching point to route the telephone call if the destination condition was "busy" or "no_answer" at the first time; and a messaging platform, in communication with the originating service switching point and capable of storing a plurality of facsimile messages, for receiving and storing a routed facsimile message;

wherein if the facsimile message was routed to the messaging platform, the messaging platform determines a destination condition at a second time, the second time later than the first time, and the messaging platform transmits the facsimile message to the final destination if the destination condition was "answer" at the second time.

32. The system of claim 31 wherein the service control point determines whether the telephone call was redirected by searching a specified memory address for a predetermined data pattern.

33. The system of claim 32 wherein the specified memory address contains a RedirectionInformation parameter wherein:

the presence of the predetermined data pattern in the RedirectionInformation parameter indicates that the telephone call was redirected; and the absence of the predetermined data pattern in the RedirectionInformation parameter indicates that the telephone call was not redirected.

34. The system of claim 31 wherein the service control point modifies the identification of the originating party if the telephone call was redirected at least one time by determining whether the telephone call was redirected more than one time.

35. The system of claim 34 wherein the service control point modifies the identification of the originating party by changing the identification of the originating party to that of a final redirecting party if the telephone call was redirected more than one time, and by changing the identification of the originating party to that of the original destination if the telephone call was not redirected more than one time.

36. The system of claim 31 wherein the routing message contains a telephone number corresponding to the messaging platform, to which the facsimile message is to be routed.

37. The system of claim 36 wherein the service control point determines the telephone number corresponding to the message platform using a lookuptable that is indexed by a telephone number corresponding to the calling party.

38. The system of claim 31 wherein a destination service switching point sends a close call message from the destination service switching point to the at least one service control point if the telephone call is completed.

39. The system of claim 31 wherein the originating service switching point sends a close call message to the at least one service control point if the telephone call is abandoned prior to receiving the routing message from the at least one service control point.

40. The system of claim 31 wherein the service control point is capable of determining that the destination is not a valid destination for receiving the facsimile message.

41. The system of claim 40 wherein the service control point aborts the telephone call if the destination is not a valid destination for receiving a facsimile message.

42. The system of claim 31 wherein the service control point launches the routing message to the originating service switching point to route the telephone call to the messaging platform only if a busy or no_answer condition is detected.

43. A method of transmitting a facsimile message using a public-switched telecommunications network, the public-switched telecommunications network having a messaging platform capable of storing a plurality of facsimile messages, the method comprising the steps of:

(a) detecting an initiation of a telephone call from an originating party on the telecommunications network to an original destination, the content of the telephone call including the facsimile message;

(b) determining a final destination, wherein the final destination is the original destination if the telephone call was not redirected at least once, and wherein the final destination is a final redirected destination if the telephone call was redirected at least one time;

(c) determining if the final destination is able to receive the telephone call at a first time;

(d) if the final destination was able to receive the telephone call at the first time, transmitting the facsimile message to the final destination;

(e) if the final destination was not able to receive the telephone call at the first time, storing the facsimile message in the messaging platform and determining if the final destination is able to receive the telephone call at a later time; and (f) if the final destination was able to receive the telephone call at the later time, transmitting the facsimile message to the final destination.

44. The method of claim 43 further comprising the step of storing the facsimile message on the messaging platform.

45. The method of claim 43 wherein the step of transmitting the facsimile message to the final destination includes the step of transmitting the facsimile message to the messaging platform only if the destination is unavailable at the first time.

46. The method of claim 45 further comprising the step of storing the facsimile message on the messaging platform.

47. The method of claim 46, wherein if the facsimile message was stored on the messaging platform, (i) determining that the final destination is available at the later time; and (ii) transmitting the facsimile message to the final destination if the final destination is available at the later time.

* * * * *

UNITED STATES PATENT AND TRADEMARK OFFICE
CERTIFICATE OF CORRECTION

PATENT NO.   : 6,125,171
DATED        : September 26, 2000
INVENTOR(S)  : Jeffrey J. Meek et al.

It is certified that error appears in the above-identified patent and that said Letters Patent is hereby corrected as shown below:

Title page,
Column 2, after line 14, insert the following line:
--5,745,561    4/1998    Baker et al. -- .

Claim 37,
Line 3, delete "lookuptable" and substitute -- lookup-table -- in its place.

Signed and Sealed this

Eleventh Day of September, 2001

Attest:

NICHOLAS P. GODICI
Attesting Officer
Acting Director of the United States Patent and Trademark Office